United States Patent
Yatabe et al.

(10) Patent No.: US 7,117,965 B2
(45) Date of Patent: Oct. 10, 2006

(54) CONTROL APPARATUS AND METHOD FOR TAKING FAILURE COUNTERMEASURE FOR HYBRID VEHICULAR DRIVE SYSTEM

(75) Inventors: Kazuo Yatabe, Kanagawa (JP); Yuusuke Minagawa, Kanagawa (JP); Keyvan Kargar, Versailles (FR); Yves Pichon, Boulogne-Billancourt (FR)

(73) Assignees: Nissan Motor Co., LTD, Yokohama (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 192 days.

(21) Appl. No.: 10/681,309

(22) Filed: Oct. 9, 2003

(65) Prior Publication Data

US 2004/0084234 A1 May 6, 2004

(30) Foreign Application Priority Data

Nov. 6, 2002 (JP) ............... 2002-322045

(51) Int. Cl.
B60W 20/00 (2006.01)

(52) U.S. Cl. .............. 180/65.3; 180/65.8; 701/22; 903/947; 903/942

(58) Field of Classification Search .......... 903/947, 903/942, 945; 180/65.2, 65.6, 65.8, 65.3; 701/22, 58, 68; 310/266, 112, 114

See application file for complete search history.

(56) References Cited

U.S. PATENT DOCUMENTS

| | | | |
|---|---|---|---|
| 5,788,006 A | * | 8/1998 | Yamaguchi ............ 180/65.2 |
| 6,098,733 A | | 8/2000 | Ibaraki et al. |
| 6,114,784 A | * | 9/2000 | Nakano .................. 310/59 |
| 6,234,930 B1 | * | 5/2001 | Kaneko et al. ............ 475/5 |
| 6,476,571 B1 | * | 11/2002 | Sasaki .................. 318/139 |
| 6,563,230 B1 | * | 5/2003 | Nada ................... 290/40 C |
| 6,566,826 B1 | * | 5/2003 | Imai et al. .............. 318/11 |
| 6,625,534 B1 | * | 9/2003 | Suzuki et al. ........... 701/62 |
| 6,722,456 B1 | * | 4/2004 | Hisada ................. 180/65.2 |

FOREIGN PATENT DOCUMENTS

| | | |
|---|---|---|
| JP | 9-117008 A | 5/1997 |
| JP | 11-332018 A | 11/1999 |
| JP | 2000-92612 A | 3/2000 |
| JP | 2001-102106 A | 4/2000 |
| JP | 2001-320806 | 11/2001 |

* cited by examiner

Primary Examiner—Jeff Restifo
(74) Attorney, Agent, or Firm—Foley & Lardner LLP

(57) ABSTRACT

In control apparatus and method for taking failure countermeasure for a hybrid vehicular drive system, on a lever diagram of a planetary gear mechanism, a revolution speed order is a first motor/generator, an engine, the output member, and a second motor/generator, high-brake and low-brake are arranged at one and the other ends of the lever diagram, respectively, with the output member as an intermediate position on the lever diagram, an output abnormality of each of the engine, the first motor/generator, and the second motor/generator which are drive sources is detected, and, with one of the first and second clutching sections clutched, a vehicular run using at least one of the drive sources whose output is detected to be normal is enabled when the drive source output abnormality detecting section detects that the output abnormalities in any one or two of the drive sources occur.

23 Claims, 12 Drawing Sheets

FIG.3

| TROUBLE LOCATION | RUN MODE | | | | | |
|---|---|---|---|---|---|---|
| | BRK CLUTCHING DIRECT POWER DISTRIBUTION RUN | High-BRK CLUTCHING RUN (ENG-on) | Low-BRK CLUTCHING RUN (ENG-on) | MGin+MGout (EV) RUN (ENG-off) | High-BRK CLUTCHING EV RUN (ENG-off) | Low-BRK CLUTCHING EV RUN (ENG-off) |
| MGin (=MG1) | A High-BRK CLUTCHING+ENG | | Low-BRK CLUTCHING ENG (+MGout) | B High or Low-BRK CLUTCHING+ ENGINE START WITH MGout | E ENGINE START WITH High-BRK CLUTCHING+ MGout | ENGINE START WITH Low-BRK CLUTCHING+ MGout |
| MGout (=MG2) | | | Low-BRK CLUTCHING ENG (+MGin) | ENGINE START Low-BRK CLUTCHING MGin | | |
| INVERTER OR BATTERY | | | Low-BRK CLUTCHING ENG | F ENGINE START WITH Low-BRK OR High-BRK+ VEHICULAR INERTIA | | |
| ENG | C High-BRK CLUTCHING+MGout | | D Low-BRK CLUTCHING+ MGin+MGout | NO CHANGE IN RUN MODE | | |

FIG.4

| TROUBLE LOCATION | TROUBLE DETERMINATION |
|---|---|
| MG INNER (ROTOR) MG OUTER (ROTOR) | 1) DETERMINE MG ERROR ACCORDING TO MC FAILURE SIGNAL<br>2) DETERMINE ERROR FROM A RESULT OF COMPARISON OF COMMAND REVOLUTION SPEED AND OUTPUT AXLE REVOLUTION SPEED<br>3) DETERMINE ERROR FROM A RESULT OF COMPARISON BETWEEN COMMANDED TORQUE AND A TIME DIFFERENTIAL VALUE OF OUTPUT SPEED |
| INVERTER | 1) DETERMINE INV ERROR ACCORDING TO MC FAIL SIGNAL<br>2) DETERMINE INV ERROR BY COMPARING POWER ON ERROR (CURRENT AND VOLTAGE) AT THE DC SIDE POWER SUPPLY (CURRENT/VOLTAGE) WITH OUTPUT ERROR AT AC SIDE |
| ENGINE | 1) DETERMINE ERROR ACCORDING TO FAILURE SIGNAL OF ENGINE CONTROLLER<br>2) DETERMINE ERROR BY COMPARING A COMMAND SPEED WITH A UNIT INPUT SPEED |
| BATTERY | 1) DETERMINE ERROR ACCORDING TO FAILURE SIGNAL OF BATTERY CONTROLLER<br>2) DETERMINE ERROR BY COMPARING HCM ACCUMULATED VALUE WITH BATTERY OUTPUT VOLTAGE |

CONTROL APPARATUS AND METHOD FOR TAKING FAILURE COUNTERMEASURE FOR HYBRID VEHICULAR DRIVE SYSTEM

BACKGROUND OF THE INVENTION

1. Field of the Invention

The present invention relates to a technical field on such a fail-safe or fail-soft as a failure countermeasure control apparatus and method for a hybrid vehicular drive system, the hybrid vehicular drive system having an engine and two motors/generators (motors functioning as generators and vice versa) as power sources (or drive sources).

2. Description of the Related Art

A Japanese Patent Application First Publication No. 2000-102106 published on Apr. 7, 2003 exemplifies a previously proposed hybrid vehicle. In the previously proposed hybrid vehicle in the above-described Japanese Patent Application First Publication, the engine, two planetary gear sets, and the two motor/generators which control sun gears of the two planetary gear sets, a carrier of one of the two planetary gear sets being coupled to the engine, and a ring gear of one of the two planetary gear sets being coupled to the road wheels.

SUMMARY OF THE INVENTION

However, in the above-identified Japanese Patent Application First Publication on the previously proposed hybrid vehicle described above, in a case where any one or more of the engine, an inverter, and a battery have failed, a control method to make the vehicle run is not disclosed. If an abnormality occurs in each or any one of these drive sources, there is a high possibility that the vehicle is disabled to run and a limp form during the abnormality in the drive source is not established.

It is, hence, an object of the present invention to provide control apparatus and method for taking failure countermeasure for a hybrid vehicular drive system which is capable of making a limp form establish during an output abnormality of any one or two of the engine, the first motor/generator, and the second motor/generator which serve as drive sources of the vehicle.

According to one aspect of the present invention, there is provided a control apparatus for taking failure countermeasure for a hybrid vehicular drive system, comprising: a planetary gear mechanism to which four elements of an engine, a first motor/generator, a second motor/generator, and an output member are linked in such a manner that, on a lever diagram of the planetary gear mechanism, a revolution speed order is the first motor/generator, the engine, the output member, and the second motor/generator; first and second clutching sections that are arranged at one and the other ends of the lever diagram with the output member as an intermediate position on the lever diagram, each of the first and second clutching section prescribing e a speed line according to a clutching thereof; a drive source output abnormality detecting section that detects an output abnormality of each of the engine, the first motor/generator, and the second motor/generator which are drive sources; and a drive source failure countermeasure control section that, with one of the first and second clutching sections clutched, enables a vehicular run using at least one of the drive sources whose output is detected to be normal when the drive source output abnormality detecting section detects that the output abnormalities in any one or two of the drive sources occur.

According to another aspect of the present invention, there is provided control method for taking failure countermeasure for a hybrid vehicular drive system, the hybrid vehicular drive system comprising: a planetary gear mechanism to which four elements of an engine, a first motor/generator, a second motor/generator, and an output member are linked in such a manner that, on a lever diagram of the planetary gear mechanism, a revolution speed order is the first motor/generator, the engine, the output member, and the second motor/generator; and first and second clutching sections that are arranged at one and the other ends of the lever diagram with the output member as an intermediate position on the lever diagram, each of the first and second clutching section prescribing a speed line according to a clutching thereof and the control method comprising: detecting an output abnormality of each of the engine, the first motor/generator, and the second motor/generator which are drive sources; and, with one of the first and second clutching sections clutched, enabling a vehicular run using at least one of the drive sources whose output is detected to be normal when detecting that the output abnormalities in any one or two of the drive sources occur.

It is noted that the first motor/generator and the second motor/generator may be two independent motors/generators or may be constituted by a common stator and two rotors which, on function, serve as two motors/generators although, on an outer appearance, they are formed in a single motor/generator. The planetary gear mechanism is a mechanism constituted by a planetary gear set having at least four revolvable elements in order to link four elements of the engine, the first motor/generator, and the second motor/generator. The planetary gear set used herein is constituted by, for example, a Ravigneaux type compound planetary gear set (train). The drive source output abnormality detecting section does not mean that the section detects the abnormality in the motor/generator itself and includes the abnormality detection for the inverter and the battery required for the drive sources to be functioned. The first clutching section is arranged in one side with the output member on the lever diagram sandwiched, is a section to prescribe a speed line according to the clutching thereof, for example, is arranged in the position coincident with a revolution speed axis of the first motor/generator on the lever diagram, and is constituted by a high-clutch to fix a gear ratio according to the clutching thereof. The second clutching section is arranged on the other side with the output member on the lever diagram sandwiched, a section which prescribes the speed line according to the clutching thereof, and arranged at a position between the revolution speed axles of the output member and the second motor/generators on the lever diagram, for example, is arranged at a position between the revolution speed axis of the output member and the revolution speed axis of the second motor/generator, and is a low-brake to fix a gear ratio according to its the clutching thereof. This summary of the invention does not necessarily describe all necessary features so that the invention may also be a sub-combination of these described features.

BRIEF DESCRIPTION OF THE DRAWINGS

FIG. 3 is an explanatory view for representing drive system failure patterns corresponding to run modes and trouble locations in the control apparatus for taking failure countermeasure for the hybrid vehicular drive system in the first embodiment shown in FIG. 1.

FIG. 4 is an explanatory view for explaining the trouble locations and the contents of the failure determination in the control apparatus for taking failure countermeasure for the hybrid vehicular drive system in the first embodiment shown in FIG. 1.

DETAILED DESCRIPTION OF THE PREFERRED EMBODIMENTS

Reference will hereinafter be made to the drawings in order to facilitate a better understanding of the present invention.

First Embodiment

Figure 1:
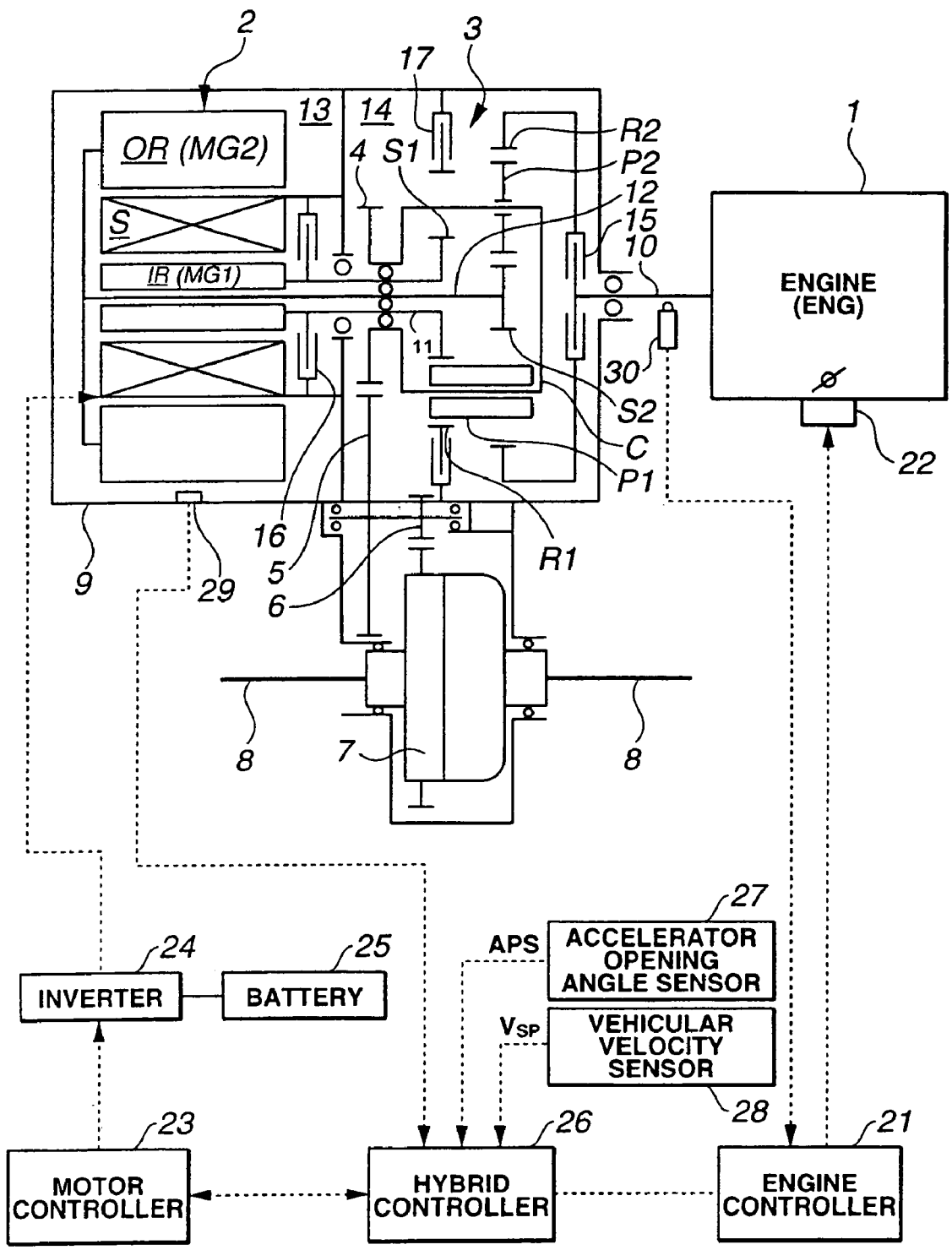
FIG. 1 is a whole system configuration of a hybrid (vehicular drive) system to which a control apparatus for taking failure countermeasure for the hybrid vehicular drive system in a first preferred embodiment according to the present invention is applicable.

FIG. 1 shows a structure of a whole hybrid vehicular drive system configuration to which a failure countermeasure control apparatus (or a control apparatus for taking failure countermeasure for a hybrid vehicular drive system) in a first preferred embodiment according to the present invention is applicable.

In FIG. 1, a drive system of the hybrid vehicle includes: an engine 1, a coaxial multiple layer motor (first motor/generator and second motor/generator), a Ravigneux (type) compound planetary gear set (planetary gear mechanism), an output gear (output member) 4, a counter gear 5, a drive gear 6, a differential 7, drive shafts 8 and 8, a motor and gear casing 9, an engine output axle 10, a first motor/generator output axle 11, a second motor/generator output axle 12, a motor chamber 13, a gear chamber 14, a clutch 15, a high-brake 16, and a low-brake 17.

Coaxial multiple layer motor 2 is fixed to motor and gear casing 9 and is constituted by a stator S as a stationary armature on which a coil is wound, an outer rotor OR arranged at an outside of stator S and in which a permanent magnet (not shown) is buried, and an inner rotor IR arranged at an inside of stator S and in which another permanent magnet (not shown) is buried, these stator S and inner and outer rotors IR and OR being coaxially arranged. Hereinafter, stator S+inner rotor IR is called a first motor/generator MG1 and stator S+outer rotor OR is called a second motor/generator MG2.

Ravigneaux type compound planetary gear set 3 has five revolvable elements including a common carrier C supporting mutually meshed first pinion P1 and second pinion P2, a first sun gear S1 which is meshed with first pinion P1, a second sun gear S2 which is meshed with second pinion P2, a first ring gear R1 which is meshed with first pinion P1, and a second ring gear R2 which is meshed with second pinion P2. A hybrid drive system is constituted by linking second ring gear R2 to engine output axle 10 via clutch 15, linking first sun gear S1 with first motor/generator output axle 11, and linking second sun gear S2 with second motor/generator output axle 12, and linking an output gear 4 to common carrier C.

Then, Ravigneaux type compound planetary gear set 3 is constituted by a double pinion type planetary gear set having first sun gear S1, first pinion P1, second pinion P2, and second ring gear R2. This double pinion type planetary gear set indicates an S-R-C alignment or R-C-S alignment on a lever diagram thereof. Therefore, four revolvable elements of engine 1, first motor/generator MG1, and second motor/generator MG2 linked to Ravigneaux type compound planetary gear set 3 are linked in such a manner that, on the lever diagram as shown in FIG. 7, the revolution speed order is as follows: first motor generator MG1 (fastest), engine 1, output gear 4, and second motor/generator MG2.

It is noted that the lever diagram (speed line diagram) is a speed line diagram used in a method of deriving a drawing which is more simple and easier to understand in place of mathematical equations in a case where a gear ratio of the planetary gear is considered. Suppose that a longitudinal axis assumes a revolution speed and, on a lateral axis, the ring gear, the carrier, and the sun gear are arranged in such a manner that each interval provides a gear teeth number ratio between the sun gear and the ring gear. It is noted that, in a case where a single pinion planetary gear set is used, since the sun gear is revolved in an opposite direction to the ring gear, a revolution speed axis of the carrier is arranged to place it in a center position. Since, in the case of the double pinion planetary gear set, the sun gear is revolved in the same direction as the ring gear, the revolution speed axle of the carrier is arranged at an outer position than that of the sun gear and the ring gear.

Figure 7:
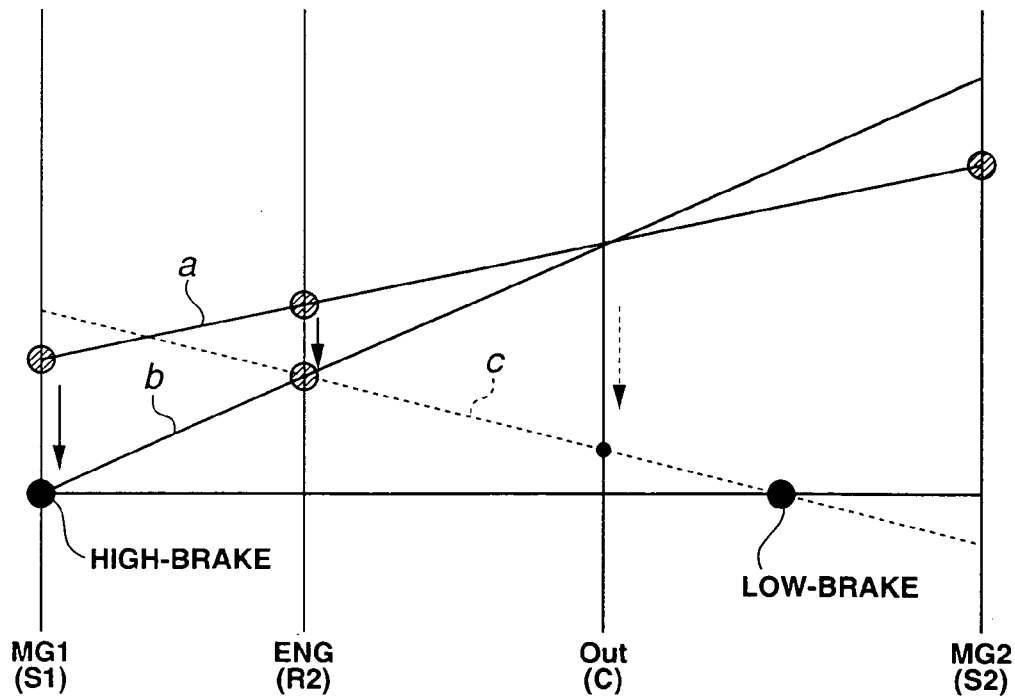
FIG. 7 is a lever diagram in an A pattern drive system failure countermeasure action in the control apparatus for taking failure countermeasure for the hybrid vehicular drive system in the first embodiment shown in FIG. 1.

High-brake 16 is arranged in the lever diagram at a position which is made coincident with the revolution speed axis of first motor/generator MG1 on the lever diagram so that the transfer of clutching fixes the gear ratio to a high gear ratio at an overdrive side as shown in FIG. 7. High-brake 16 in the first embodiment is arranged at a position at which first sun gear S1 is fixable to the motor and gear casing 9.

Low-brake 17 is arranged at a position between a revolution axle of output gear 4 and a revolution axle of second motor/generator MG2 and a change in the clutching causes low-brake 17 to be fixed to an overdrive high gear ratio (refer to FIG. 7). High-brake 18 in the first embodiment is positioned at a position that enables the first sun gear to be fixed to the motor and gear casing 9.

An output revolution and an output torque from output gear 4 are transmitted to driven wheels (not shown) from drive shafts 8 and 8 passing through counter gear 5→drive gear 6→differential gear 7.

The structure of a control system of the hybrid vehicle will herein be described with reference to FIG. 1. In FIG. 1, a reference numeral 21 denotes an engine controller, a reference numeral 22 denotes a throttle valve actuator, a reference numeral 23 denotes a motor controller, a reference numeral 24 denotes an inverter, a reference numeral 25 denotes a battery (DC power supply), a reference numeral 26 denotes a hybrid controller, a reference numeral 27 denotes an accelerator opening angle sensor, a reference numeral 29 denotes a motor temperature sensor, and a reference numeral 30 denotes an engine speed sensor 30.

Engine controller 21 outputs a command to control a revolution speed of engine 1 in accordance with a command issued from hybrid controller 26 to a throttle valve actuator 22. That is to say, a detected value of the engine speed from engine speed sensor 30 is used to control an open and closure of a throttle valve as a feedback information. Motor controller 23 outputs a command to inverter 24 to control revolution speed N1 and a torque T1 of first motor/generator MG1 and revolution speed N2 and torque T2 of the second motor/generator MG2, independently of each other. Inverter 24 is connected with stator S of co-axial multiple layer motor 3 produces a compound current (AC) which is a composite (superposition) of drive current flowing through inner rotor IR and drive current flowing through outer rotor OR. This inverter 24 is connected to battery 25. Hybrid controller 26 receives accelerator opening angle sensor 27, vehicular speed sensor 28, motor temperature sensor 29, and engine speed sensor 30 and carries out predetermined arithmetic operation processes. An engine control program outputting a control command in accordance with a result of the predetermined arithmetic operation results to engine controller 21 and a motor control program outputting a motor control program outputting a control command in accordance with the result of the predetermined arithmetic operation to motor controller 23.

In addition, various run modes are always grasped by means of hybrid controller 26 and are driven. Then, if the failure occurs in the drive system described above, hybrid controller 26 has a trouble location determining section to specify the trouble location. Furthermore, in the failure corresponding run mode selecting portion of hybrid controller 26, the corresponding run control method is determined in accordance with the trouble location and the run mode.

It is noted that hybrid controller 26 and engine controller 21 and hybrid controller 26 and motor controller 23 are interconnected, respectively, via bidirectional communication lines.

Next, featuring points of the hybrid vehicular-drive system in the first preferred embodiment will be described below.

(1) Adaptation of coaxial multiple layer motor: As one motor/generator, two-rotor-one-stator co-axial multiple layer motor 2 has bee adopted. Hence, two lines of magnetic force are created with outer rotor magnetic force line and inner rotor magnetic force line. Thus, coil (in stator S) and inverter 24 can commonly be used with respect to two inner rotor IR and outer rotor OR The drive currents for inner rotor IR and for outer rotor OR are superposed to form the compound current. The compound current is applied to a single coil so that two rotors of IR and OR are respectively independently controlled. In other words, as an outer appearance, this structure of motor/generator is a single coaxial multiple layer motor 2, a combination of the same or different kinds of functions is combined. Hence, for example, as compared with in a case where the two independent motor/generators are installed having the stator and the rotor respectively, such a coaxial multiple layer motor 2 has advantages in terms of a cost (the number of parts can be reduced, a reduction in a current rating of the inverter, a reduction of permanent magnet, a size reduction (a miniaturization due to a coaxial structure and a reduction of the inverter size), and an efficiency (iron loss reduction and inverter loss reduction).

In addition, a control over the compound current permits not only a use of "motor+generator" but also permits a use of "motor+motor" and "generator+generator". Thus, a high selection degree of freedom is provided. Hence, for example, as described in the first embodiment, in a case where the coaxial multiple-layer motor 2 is adopted in the drive source of the hybrid vehicle, a most effective or most efficient combination can be selected in accordance with a vehicle state from among these many selection candidates.

(2) Adoption of Ravigneaux Type Compound Planetary Gear Set.

As the hybrid vehicular drive system in the first preferred embodiment, in the hybrid drive system having four elements of the engine, first motor/generator, second motor/generator, and the output member, one of various types of planetary gear mechanisms can be adopted if at least four revolvable elements are provided in order to line the four elements.

However, from among great many of planetary gear mechanisms are considered, a rigidity lever model which can easily represent a dynamic operation of the planetary gear mechanism can be introduced. In addition, due to the reason that the axial dimension becomes short and a compact planetary gear mechanism is manufactured, the above-described Ravigneaux type complex planetary gear set 3 has been adopted.

That is to say, although Ravigneaux type compound planetary gear set 3 is a width dimension of the two-row planetary gear sets, four planetary gear sets (two parallel longitudinal planetary gear sets and two crossed forward-rearward directional planetary gear) can be represented. Hence, as compared with a case where the four planetary gear sets are aligned in the axial direction, an extremely axial direction size can be shortened.

(3) Application to Hybrid Drive System

The following listed merits are present in a case where coaxial multiple layer motor 2 and Ravigneaux type compound planetary gear set 3 are applied to the hybrid drive system.

<1> Since motor 2 and planetary gear set 3 are of the co-axial structure, output axles 11 and 12 of coaxial multiple layer motor 2 and both of sun gears S1 and S2 of Ravigneaux type compound planetary gear set 3 are simply linked by means of, for example, a spline coupling. In this way, a compatibility of the combination is very favorable between these mechanisms. In addition, in terms of space saving, cost reduction, and light weight, they are advantageous.

<2> In a case where one of both of the first motor/generator and the second motor/generator, viz., the coaxial multiple layer motor 2 is used as a discharger (motor) but the other of both of the first motor/generator and the second motor/generator is used as a generator, it is possible to control a motor current via single inverter 24. In addition, a power consumption from the battery can be reduced. For example, in a case of a direct power distribution control mode, theoretically, the power consumption from battery 25 can be zeroed.

<3> In a case where both of the coaxial multiplayer motor 2 is used as the discharger (motor), a range of the drive can be widened. That is to say, a value which is a multiplication of the respective motor powers causes all regions equal to or below a power maximum value (constant value) to be a drive enabling range. Such a combination that one of the two motors has a small power and the other motor has a large power can be used.

Next, an action of the failure countermeasure control apparatus in the first embodiment according to the present invention will be described below.

[Failure Countermeasure Control Procedure in the Drive System]

Figure 2:
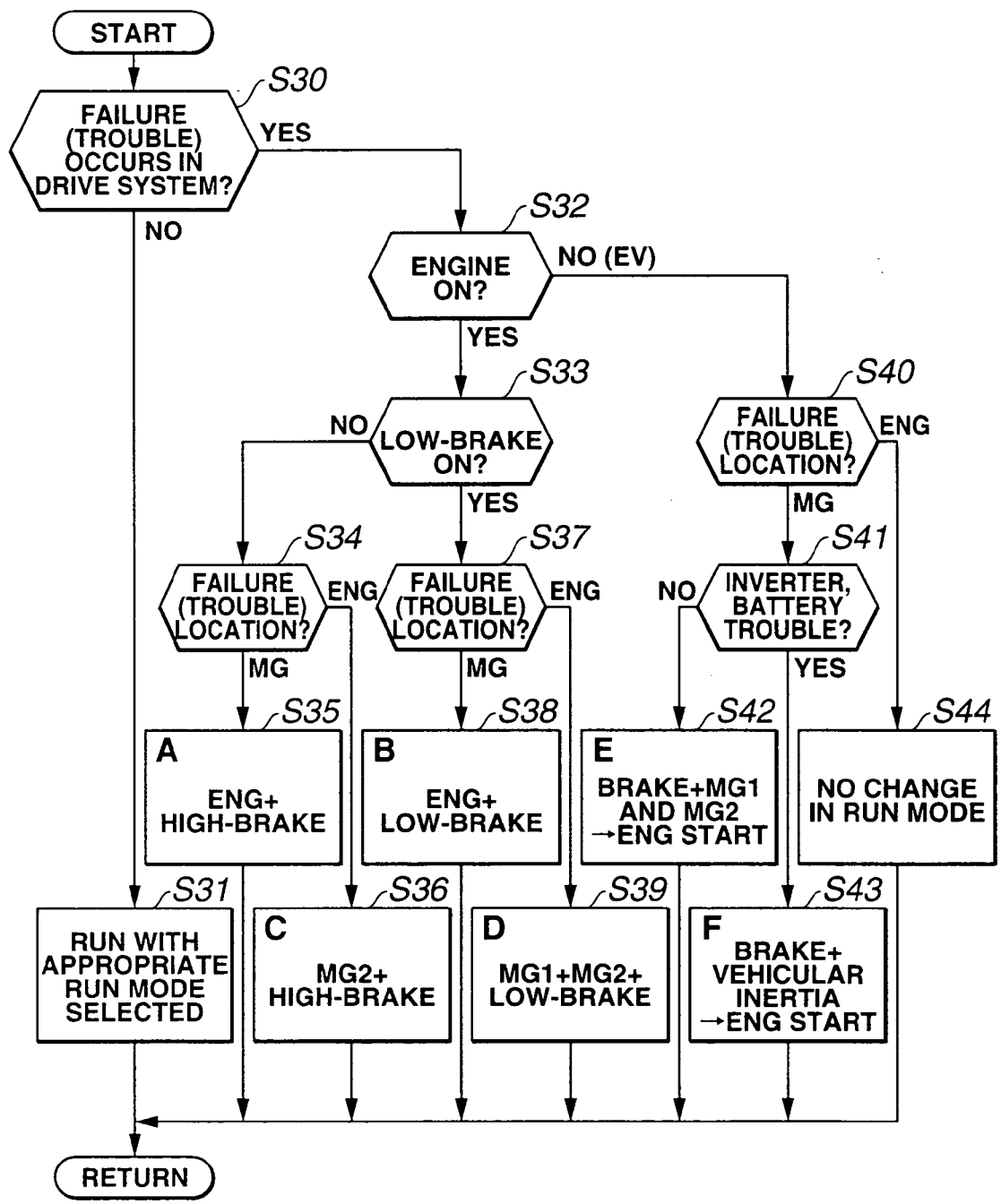
FIG. 2 is an operational flowchart executed by a hybrid controller shown in FIG. 1 for representing a control procedure of taking failure countermeasure for the hybrid vehicular drive system shown in FIG. 1.

FIG. 2 shows an operational flowchart representing a flow of process on a drive system failure countermeasure control procedure in the first embodiment described above executed by hybrid controller 26.

At a step S30, hybrid controller 26 determines whether the drive system has failed. If Yes at step S30, the routine goes to a step S32. If No at step S30, the routine goes to a step S31. At step S31, hybrid controller 26 selects an optimum run mode in accordance with a vehicular state or a running state, for example, the direct power distribution control (run) mode or EV (Electric Vehicle) run mode. In the hybrid vehicle, the running control during the drive system normal operation is executed in the selected run mode. On the other hand, at step S32, hybrid controller 26 determines if engine 1 is in the drive state. If the engine is in the drive state (Yes) at step S32, the routine goes to a step S33. If No at step S32, the routine goes to a step S40. At step S33, hybrid controller 26 determines if low-brake 17 should be engaged. In details, hybrid controller 26 determines if this is the time at which a low-brake clutching running mode with engine 1 as the drive source. If Yes at step S33, the routine goes to a step S37. If No at step S33, the routine goes to a step S34. At step S34, hybrid controller 26 determines if a location of the trouble (failure) is the motor/generator system or the engine system. If the trouble location is in the motor/generator system (MG) at step S34, the routine goes to a step S35. If the trouble location is in the engine system (ENG), the routine goes to a step S36.

At step S35, hybrid controller 26 fixes a high-brake clutching run mode with the engine 1 as the drive source in accordance with a pattern A of FIG. 3 according to the determinations of run mode at steps S32 and S33 and according to the trouble location at step S34, during the direct power supply distribution run mode by means of a brake release with engine 1, the first motor/generator MG1, and second motor/generator MG2 as the drive sources, or during a high-brake clutching run mode with engine 1 as the drive source, and when an output of at least one of the first motor/generator MG1 and second motor/generator MG2 is detected that an abnormality occurs.

Then, at step S36, hybrid controller 26 fixes a high-brake clutching run mode with the engine 1 as the drive source in accordance with a pattern C of FIG. 3 according to the determinations of run mode at steps S32 and S33 and according to the trouble location at step S34, during the direct power supply distribution run mode by means of a brake release with engine 1, the first motor/generator MG1, and second motor/generator MG2 as the drive sources, or during the high-brake clutching run mode with second motor/generator MG2 as the drive source, and when an output of engine 1 is detected that an abnormality occurs.

On the other hand, at a step S37, hybrid controller 26 determines if the trouble location is in the motor/generator system or the engine system. If the trouble location is in the motor/generator system (MG) at step S37, the routine goes to a step S38. If the trouble location is in the engine system (ENG) at step S37, the routine goes to a step S39.

At step S38, hybrid controller 26 fixes the mode to a low-brake clutching run mode which is a drive source of at least engine 1 in accordance with a B pattern shown in FIG. 3 according to the results of running mode determinations at steps S32 and S33, the determination of the trouble location at step S37, during the low-brake clutching mode with engine 1 as the drive source and when the output of at least one of the first and second motors/generators MG1 and MG2 has the abnormality.

The trouble response run mode according to the B pattern shown in FIG. 3 is depending upon a specific failure location of the motor/generator system. (1) At the time of failure in first motor/generator MG1, Low-brake clutching and engine (+second motor/generator MG2). (2) At the time of failure of second motor/generator MG2. Low-brake clutching and engine (+first motor/generator MG1). (3) At the time of failure in inverter 24 or battery 25, Low-brake clutching and engine. As described above, the trouble response run mode can precisely be determined. At step S39, hybrid controller 26 fixes the run mode to low-brake clutching run mode in which the first and second motors/generators MG1 and MG2 are drive sources in accordance with a D pattern of FIG. 3 according to the results of determinations at steps S32 and S33 and trouble location determination at step S37, and when the output of engine 1 has some abnormality during the low-brake clutching run mode with engine 1 as the drive source.

At a step S40, hybrid controller 26 determines if the trouble location is in the motor/generator system or the engine system when EV run is determined at step S32. If the trouble location is in the motor/generator system, the routine goes to a step S41. If the trouble location is in the engine system, the routine goes to a step S44. At a step S41, hybrid controller 26 determines whether, from among the failure in the motor/generator system, the trouble location is a failure in inverter 24 or battery 25. If it is not other than inverter failure nor battery failure (No), the routine goes to a step S42. If either the inverter failure or battery failure (Yes) at step S41, the routine goes to a step S43.

At step S42, hybrid controller 26 starts engine 1 with high-brake 16 or low-brake 17 clutched and with at least one of the motors/generators MG1 or MG2 which is normal as the drive source in accordance with an E pattern in FIG. 3 when the output abnormality is detected to occur in an output of either the first motor/generator MG1 or second motor/generator MG2 during a run mode in which at least one of the first motor/generator MG1 and the second motor/generator MG2 is the drive source according to the run mode determination at step S32 and the trouble location determination at steps S40 and S41.

It is noted that the failure countermeasure mode according to E pattern of FIG. 3 is precisely determined according to the run mode and the specific failure position of motor/generator system.

<1> EV run mode by means of first and second motors/generators MG1 and MG2 is carried out and the trouble location is first motor/generator MG1: In this case, high-brake 16 or low-brake 17 is clutched plus engine 1 start and second motor/generator MG2.

<2> EV run mode due to the clutching of high-brake 16 and the trouble location is MG1. In this case, high-brake 16 is clutched+the start of engine 1 by means of second motor/generator MG2.

<3> EV run mode due to the clutching of low-brake 17 and the trouble location is first motor/generator MG1. In this case, low-brake 17 is clutched+the start of engine 1 by means of second motor/generator MG2.

<4> In the EV mode, the trouble location is second motor/generator MG2. In this case, with low-brake 17 clutched, first motor/generator MG1 starts engine 1.

Then, at step S43, hybrid controller 26 starts engine 1 utilizing a vehicular inertia with high-brake 16 or low-brake 17 engaged (clutched) in accordance with an F pattern shown in FIG. 3 when abnormalities of both outputs of the first and second motor/generators MG1 and MG2 occur during the run mode in which at least one of first and second motors/generators MG1 and MG2 is the drive source with engine 1 stopped according to the run mode determination at step S32 and the determinations of the trouble location at steps S40 and S41. At a step S44, hybrid controller 26 determines that the run mode is EV run at step S32 and at step S40 the trouble location is determined to be in the engine system, the EV run mode is maintained without modification of the run mode.

[Failure (Trouble) Determination]

Trouble determinations at steps S34, S37, S40, and S41 shown in FIG. 2 are carried out in accordance with a failure determination table, for example, shown in FIG. 4.

(A case where the trouble location is at least one of the first and second motors/generators (MG1, MG2)) The failure is determined as follows:

1) Determine a motor/generator system error (abnormality) according to a failure signal issued from motor controller 23.

2) Determine the error by comparing a command revolution speed and an output axle revolution speed;

3) Determine the error by comparing a command output and a differential value of the output revolution speed with respect to time.

(A case where the trouble location is in inverter 24) The failure therein is determined as follows: 1) determines the inverter failure according to a failure signal issued from motor controller 23.

2) determines the inverter failure by comparing a power supply at the DC side and the output power at an alternating current side.

(A case wherein the trouble location is in battery 25) The failure therein is determined as follows: 1) determines a battery error (abnormality) according to the failure signal from a battery controller (usually motor controller 23 function as the battery controller). 2) determines the battery error (abnormality) by comprising an accumulated value of the hybrid controller 26 with the battery output voltage.

[During the Drive System Normality]

When the drive system functions normally, the flow of the flowchart shown in FIG. 2 is advanced as follows: step S30→step S31. At step S31, an optimum run mode in accordance with the vehicle state and the run state is selected and a vehicular run control during the normality of the drive system is executed.

Figure 5:
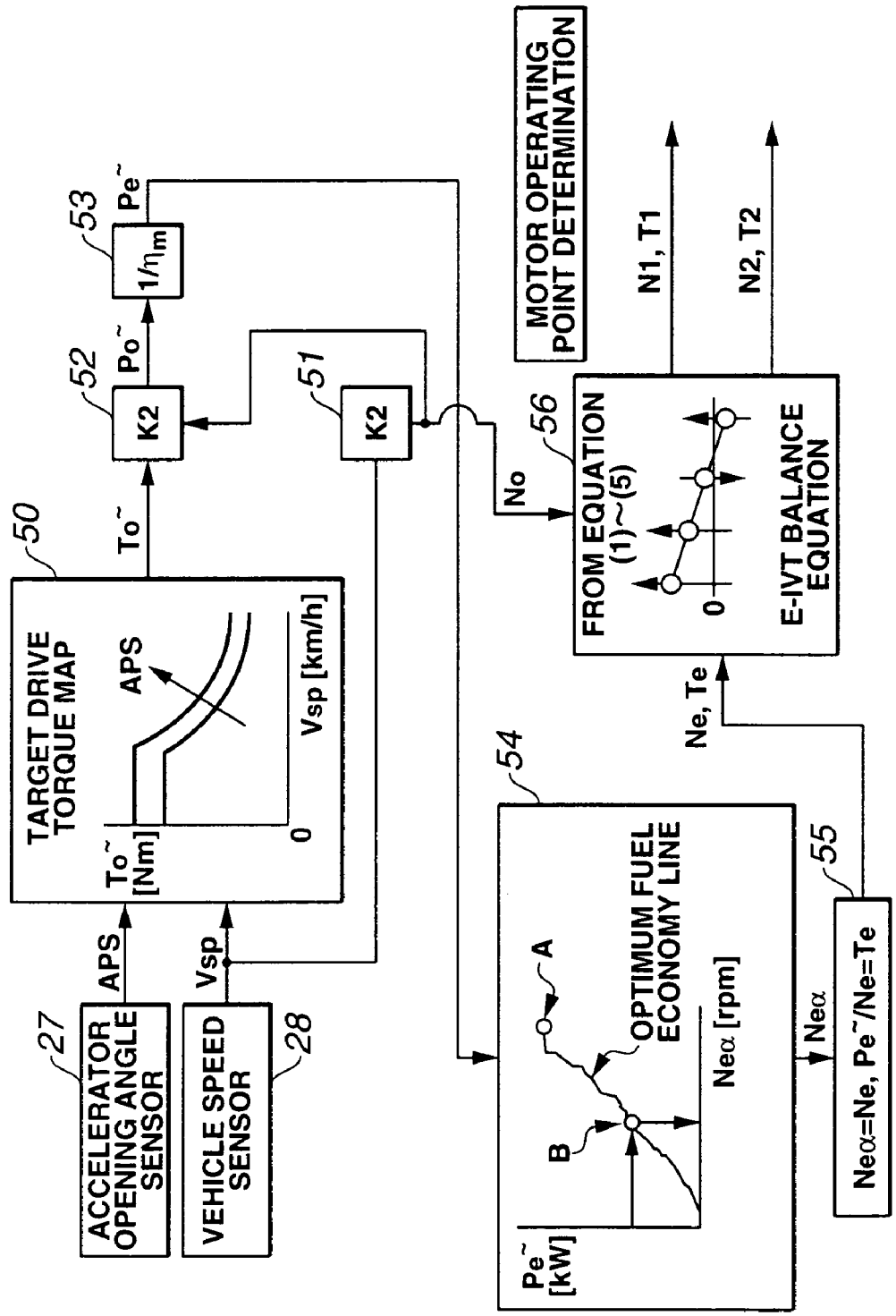
FIG. 5 is a motor control block diagram in a direct power distribution control (run) mode in the hybrid controller in the case of the control apparatus for taking failure countermeasure for the hybrid vehicular drive system in the first embodiment shown in FIG. 1.

The vehicular run control in the direct power distribution run mode which is an example of the run mode will be described with reference to FIGS. 5 and 6.

It is noted that the direct power distribution mode is a run mode in which one of first and second motors/generators MG1 and MG2 is used as a power motor and the other is used as a power generator, the revolution speeds N1 and N2 and torques T1 and T2 of the respective motors/generators are determined and controlled so that an income-and-outgo of both first and second motors/generators MG1 and MG2 becomes zeroed. FIG. 5 shows a block diagram of the direct power distribution control block diagram. In FIG. 5, a reference numeral 50 denotes a target drive torque determining section, a reference numeral 51 denotes an output axle revolution speed calculating section, a reference numeral 52 a target power calculating section 53, and a reference numeral 54 denotes an optimum fuel consumption engine revolution speed determining section, a reference numeral 55 denotes an engine revolution speed & engine torque calculating section, and a reference numeral 56 denotes a motor operating point calculating section.

Target drive torque determining section 50 determines a target drive torque $To\sim$ on the basis of accelerator opening angle detection value APS, the vehicular velocity detection value Vsp, and the target drive torque map. Output axle revolution speed calculating section 51 calculates output axle revolution speed No using vehicular velocity detection value Vsp and conversion coefficient K1. Target power calculating section 52 calculates a target engine power $Pe\sim$ using target drive torque $To\sim$ from target drive torque determining section 50 and an output axle revolution speed No from output axle revolution speed calculating section 51, and conversion coefficient k2. Target engine power calculating section 53 calculates target engine power $Pe\sim$ using target power $Po\sim$ and a mechanical efficiency $\eta m$.

Optimum fuel consumption engine speed determining section 54 determines an optimum fuel consumption engine speed $Ne\alpha$ using an engine output map by means of optimum fuel economy lines. Engine revolution speed and engine torque calculating section 55 calculates engine torque Te according to engine power $Pe\sim$ and the engine speed Ne.

Motor operating point calculating section 56 inputs engine speed Ne, output axle revolution speed No, and engine torque Te and calculates motor operating points (N1, T1, N2, T2) in the direct power distribution run mode by solving simultaneous dynamical equations in which, in equations (1) through (5) (E–IVT balance equations), a battery power Pb in equation (4) is supposed as Pb=0.

Figure 6:
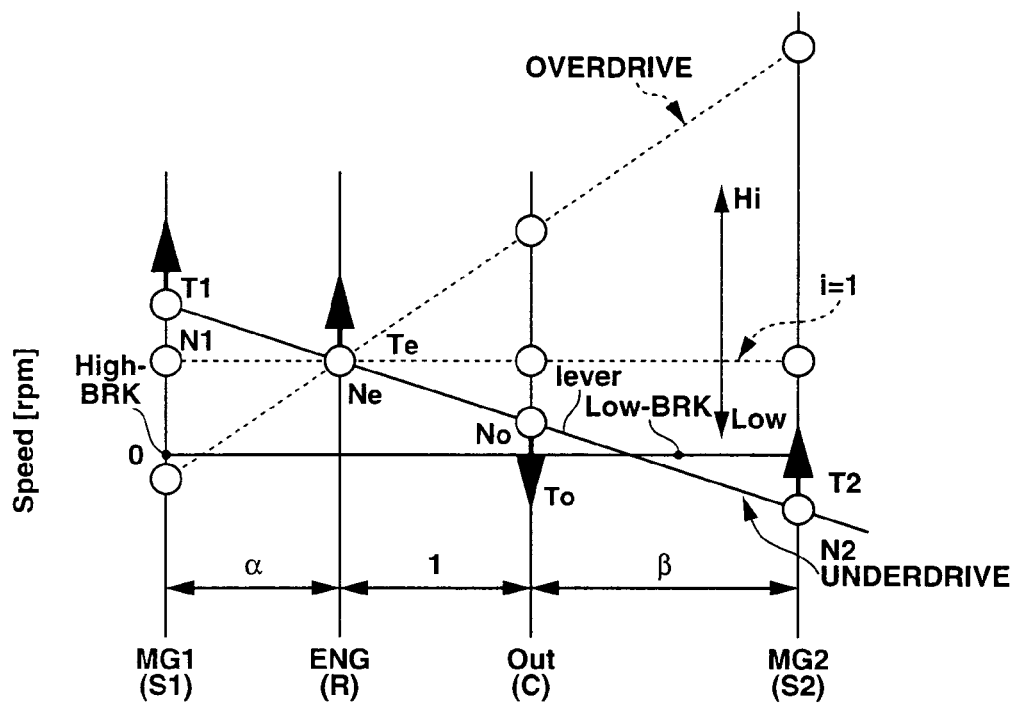
FIG. 6 is a lever diagram in the direct power distribution control (run) mode in the control apparatus for taking failure countermeasure for the hybrid vehicular drive system in the first embodiment.

A lever diagram of the direct power distribution run mode is as shown in FIG. 6. Theoretically, the battery load is zero, while securing a preferable fuel consumption performance, revolution speed N1 of first motor/generator MG1 and that N2 of second motor/generator MG2 are controlled so that a wide gear ratio from the underdrive to the overdrive can be achieved. Furthermore, in the direct power distribution mode, the following merits are provided.

① Motor balancing points (revolution speeds N1 and N2 and torques T1 and T2 of first motor/generator MG1 and second motor/generator MG2 can easily be calculated according to balance equations.

② Two points of gear ratios at which a motor power (=motor passing power) indicates zero are provided (for example, 1/gear ratio=about 0.6 or around thereof and 1/gear ratio=about 1.5 or around thereof).

③ The motor torque becomes large as the gear ratio is directed toward low gear ratio. In other words, an electrical low side gear ratio is determined by means of motor torques T1 and T2.

④ During the low engine output, no limitation is received at both of motor torques T1 and T2 and revolution speeds of N1 and N2 and very wide range of the gear ratio can be taken.

[Failure Countermeasure Control Action]

(1) Failure Countermeasure in the A Pattern.

During the direct power distribution run mode in which the brakes are released with first motor/generator MG1 and second motor/generator MG2 as the drive sources or during the high-brake clutching run mode with engine 1 as the drive sources, the output of at least one of first motor/generator MG1 and second motor/generator MG2 is detected to have the abnormality. In this case, in the flowchart of FIG. 2, the flow such as step S30→step S32→step S33→Step S34→step S35 is advanced. Thus, in accordance with the A pattern shown in FIG. 3, the hybrid vehicular drive system is fixed to the high-brake clutching run mode with engine 1 as drive source.

For example, during the direct power distribution run mode, in a case where one of motors/generators MG1 or MG2 has failed with the lever state denoted by a in FIG. 7, high-brake 16 is clutched to fix first motor/generator MG1 (viz., first sun gear S1) so that the engine speed (second ring gear ratio R2) is reduced. Thus, the lever state is transferred to that denoted by b of FIG. 7. After motor/generator MG1 or MG2 is failed during the run in the direct power distribution run mode, output revolution (vehicular speed) of output gear 4 (common carrier C) is not carried out but maintains the run without change. Then, the gear ratio from engine 1 to output gear 4 is shifted toward a higher ratio side before the occurrence of failure. Hence, a less influence occurs due to the torque variation by means of engine 1 so that a safe control can be achieved.

In a case where the vehicular velocity (output revolution speed) is reduced in a midway through run in the high-brake clutching run mode corresponding to the high-brake clutching run mode of the failure countermeasure with engine 1 as the drive source, low-brake 17 is clutched. Thus, the lever state of the hybrid vehicular drive system in the first embodiment is transferred to that denoted by c of FIG. 7. Thus, the vehicle can run at a two-stage gear ratio type transmission. Consequently, the limp form can be estabs, lihed.

In the first embodiment, when high-brake 16 is clutched, second motor/generator MG2 is used so that the lever can be moved so as not to change the output revolution speed during the high-brake clutching. In this case, a variation in the output driving force can extremely be reduced.

(Failure Countermeasure to B Pattern)

When the abnormality is detected in the output of at least one of first motor/generator MG1 and the second motor/generator MG2, the flow in the flowchart of FIG. 2 is such as step S30→step S37→step S38. In accordance with the B pattern of FIG. 3, the low-brake clutching run mode is fixed in which at least engine 1 is the drive source in accordance with the B pattern of FIG. 3.

Figure 8:
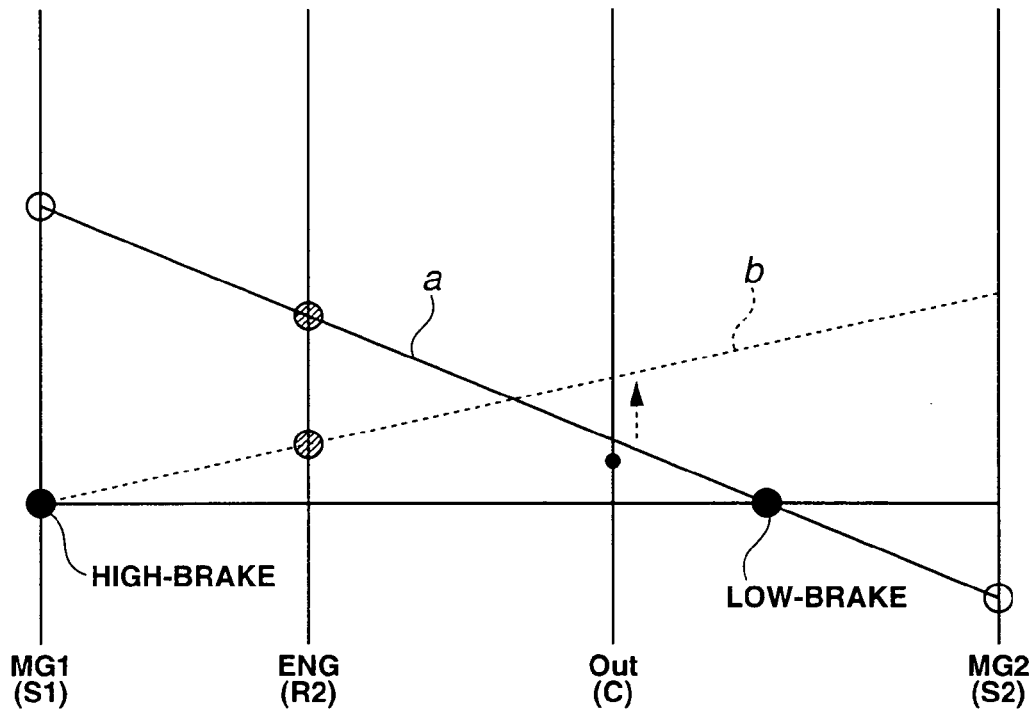
FIG. 8 is a lever diagram in a B pattern drive system failure countermeasure action for the hybrid vehicular drive system in the first embodiment shown in FIG. 1.

For example, due to a breakage in a control signal during the low-brake clutching run mode with engine 1 as the drive source, the failure occurs under the lever state denoted by a of FIG. 8. In this case, due to the failure in the lever state denoted by a of FIG. 8, neither first motor/generator MG1 nor second motor/generator MG2 can generate the torque. Hence, in this mode of the low-brake clutching run mode, the clutching of low-brake 17 is held in a fixture state of the gear ratio and the vehicle is to run using engine 1. This failure countermeasure holds the lever state denoted by a of FIG. 8 after the failure countermeasure. Without change in the output revolution speed (vehicular velocity), the run mode can be maintained at it is. In addition, if only one of first and second motors/generators MG1 and MG2 has failed, the drive source can be taken (engine 1 plus normally operated one of the two motors/generators MG1 and MG2).

Furthermore, in a case where the vehicular velocity (output revolution speed) is raised in a midway through the run of the low-brake clutching run mode with at least engine 1 as the drive source, high-brake 16 is clutched so that the lever state is transferred to the lever state denoted by b of FIG. 8. Thus, the vehicle can run as two-stage gear ratio transmission system. Consequently, the limp form is formed.

(3) Failure Countermeasure at the C Pattern.

When the abnormality in the output of engine 1 is detected to occur during the direct power distribution run mode due to the release of the brake with engine 1, first motor/generator MG1, and second motor/generator MG2 as the three drive sources or during the high-brake clutching run mode with engine 1 as the drive source, in the stream of flow in the flowchart of FIG. 2, the routine advances as step S30→step S32→step S33→step S34→step S36. Then, the run mode is fixed top the high-brake clutching run mode with second motor/generator MG2 as the drive source in accordance with pattern C of FIG. 3.

Figure 9:
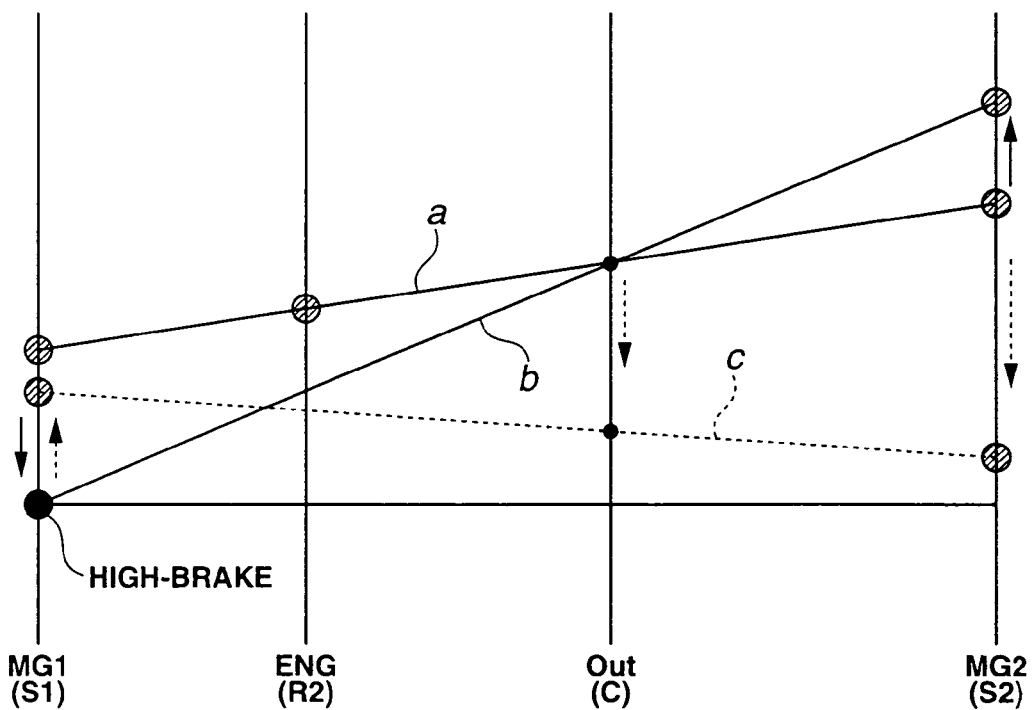
FIG. 9 is a lever diagram in a C pattern drive system failure countermeasure action in the control apparatus for taking failure countermeasure for the hybrid vehicular drive system in the first embodiment shown in FIG. 1.

For example, in a case where, during the direct power distribution run mode, engine 1 has failed under the lever state denoted by a of FIG. 9. In this case, high-brake 16 is clutched so as to fix first sun gear S1 and the revolution speed of first motor/generator MG1 is raised so that the lever state is transferred to the lever state as denoted by b of FIG. 9. After the engine 1 has failed during the run in the direct power distribution mode, without the change in output revolution speed (vehicular velocity) of output gear 4 (common carrier C), the present running state can be maintained. Then, the gear ratio from engine 1 to output gear 4 is shifted toward the high gear ratio before the failure after the failure. Hence, an effect due to a torque variation of engine 1 is less so that a safety run can be controlled.

In addition, in a case where the vehicle speed (output revolution speed) is reduced in a midway through the run in the high-brake clutching run mode to cope with the occurrence of failure with engine 1 as the drive source, the high-brake is released and the EV run with first motor/generator MG1 and second motor/generator MG2 as the drive sources is carried out. Hence, the lever state is transferred to that denoted by c of FIG. 9. Consequently, the limp form can be established.

(4) Failure Countermeasure at a D Pattern.

When, during the low-brake clutching run mode with engine 1 as the drive source, the output of engine 1 is detected to have abnormality, the flow in the flowchart of FIG. 2 is as follows: step S30→step S32→step S33→step S37→step S39. In accordance with the D pattern of FIG. 3, the run mode is fixed to low-brake clutching run mode with first and second motor/generators MG1 and MG2 as the drive sources.

Figure 10:
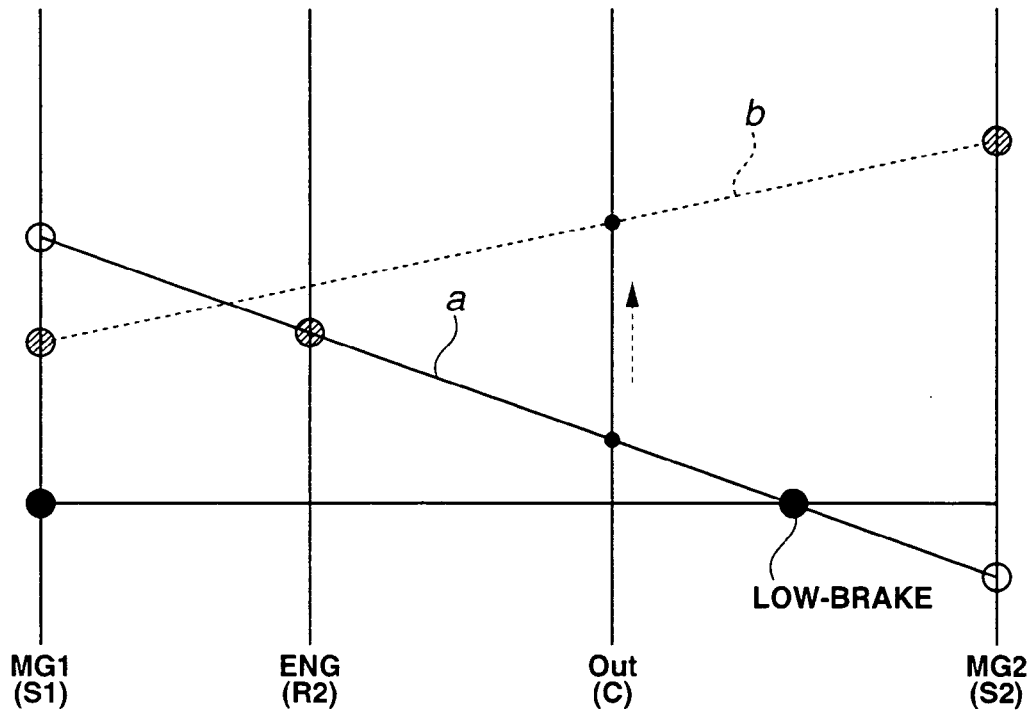
FIG. 10 is a lever diagram in a D pattern drive system failure countermeasure action in the control apparatus for taking failure countermeasure for the hybrid vehicular drive system in the first embodiment shown in FIG. 1.

For example, in a case where due to a control error of engine controller 21 during the low-brake clutching run with engine 1 as the drive source so that the failure under the lever state denoted by a in FIG. 10 occurs. In this case, engine 1 cannot develop the torque due to the failure in engine 1. Then, in this mode, the gear ratio is fixed with the clutching of low-brake 17 held so that, using first and second motor/generators MG1 and MG2, the vehicle runs. This failure countermeasure causes the lever state as denoted by a of FIG. 10 to be held. Without change in output revolution speed (vehicular velocity), the vehicle can be maintained as it is.

In addition, in a case where the vehicular velocity (output revolution speed of the hybrid vehicular drive system) becomes lowered in a midway through failure responding low-brake clutching run mode and in a case of the motor/generator operating point at which driving efficiencies of motors/generators MG1 and MG2 are worse, low-brake 17 is released so that the run mode is transferred to EV run mode in which both of first and second motor/generators MG1 and MG2 as drive sources. Thus, the lever state is transferred to a state denoted by b in FIG. 10. Using the high gear ratio, the vehicle can run. Thus, the limp form is formed.

(5) Failure Countermeasure to E Pattern.

When, with engine 1 stopped, in the run mode during which at least one of first motor/generator MG1 and second motor/generator MG2 serves as the drive source, the output abnormality of at least one of first and second motors/generators MG1 and MG2 is detected to occur, in the flowchart shown in FIG. 2, the flow of step S30→step SS32→step S40→step S41→step S42 occurs. In accordance with an E pattern shown in FIG. 3, one of first and second motors/generators MG1 and MG2 which is normally operated serves as the drive source and engine 1 is started with high-brake 16 or low-brake 17 clutched.

A failure countermeasure mode in accordance with E pattern shown in FIG. 3 will be described below.

<1> A case wherein, during the EV run mode with first and second motors/generators MG1 and MG2 as the drive sources, the trouble location is first motor/generator MG1.

Figure 11:
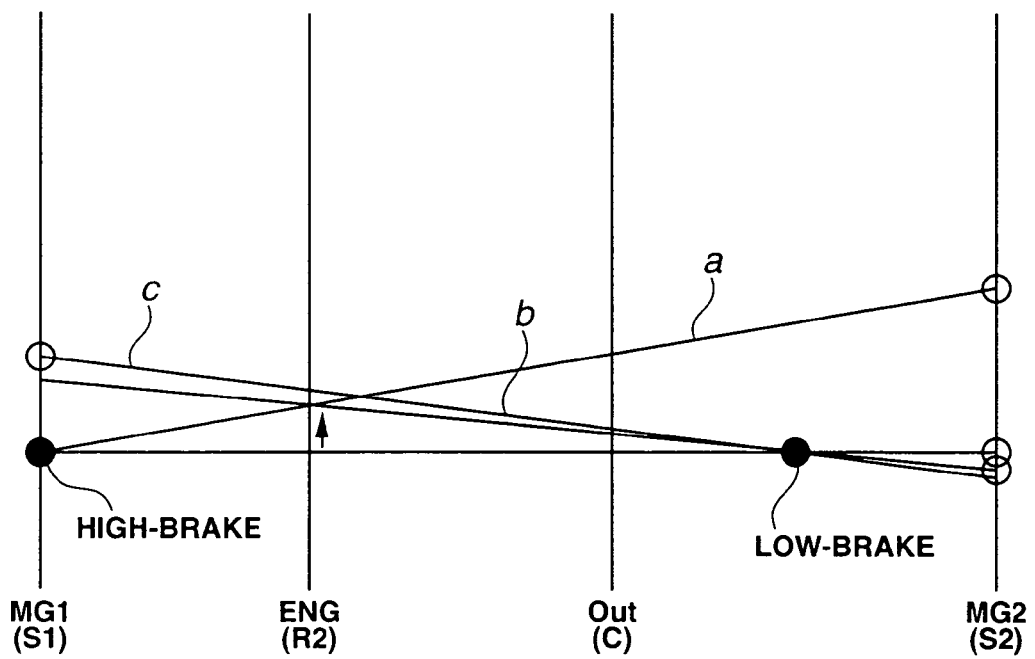
FIG. 11 is a lever diagram in an E pattern drive system failure countermeasure action in the control apparatus for taking failure countermeasure for the hybrid vehicular drive system in the first embodiment shown in FIG. 1.

Since the trouble location is first motor/generator MG1, second motor/generator MG2 which is detected to be normal is used as engine starting motor. For example, with high-brake 16 clutched, second motor/generator MG2 is revolved in a normal (positive) direction to start engine 1 (refer to a of FIG. 11). Or alternatively, with low-brake 17 clutched, second motor/generator MG2 is revolved in a reverse direction to start engine 1 (refer to b in FIG. 11).

<2> A case wherein, during the EV run mode with high-brake 16 clutched, the trouble location is MG1.

Since the trouble location is first motor/generator MG1, with the clutching of high-brake 16 maintained, second motor/generator MG2 which is detected to be normally operated is used as the engine start motor. In other words, with high-brake 16 clutched, second motor/generator MG2 revolved in the normal direction, engine 1 is started (refer to a of FIG. 11).

<3> A case wherein, during the EV run mode due to the clutching of low-brake 17, the trouble location is MG1. The trouble location is the first motor/generator MG1. Hence, with the clutching of low-brake 17 maintained, second motor/generator MG2 is used which is detected to be normally operated is used as engine start motor. In details, with low-brake 17 clutched, second motor/generator MG2 is revolved in the reverse direction to start engine 1 (refer to b in FIG. 11).

<4> A case wherein, in the EV run mode, the trouble location is MG2. The trouble location is second motor/generator MG2. Hence, first motor/generator MG1 which is detected to be normal is used as engine start motor. In details, with low-brake 17 clutched, first motor/generator MG1 is revolved in the normal direction to start engine 1 (refer to c in FIG. 11). The start of engine 1 is secured in the patterns of <1> through <4> described above. After the start of engine 1 is secured, the vehicle can run at the two-stage gear shift between the low gear ratio with low-brake 17 clutched and the high gear ratio with high-brake 16 clutched. Consequently, the limp form is established.

(6) Failure Countermeasure in the Pattern of F. During the run mode with at least one of first motor/generator MG1 and second motor/generator MG2 as the drive source with engine 1 stopped, the abnormality in the outputs of both of first and second motor/generators MG1 and MG2 is detected to occur. In this case, the stream of the flowchart in FIG. 2 is as follows: step S30→step S32→step S40→step S41→step S43. Thus, in accordance with the F pattern of FIG. 3, high-brake 16 or low-brake 17 is clutched. Then, engine 1 is started with a vehicular inertia. For example, due to the failure in inverter 24, the torque by means of both of first motor/generator MG1 and second motor/generator MG2 cannot be developed. In addition, the input power source is not present due to the stop of engine 1. Thus, in this run mode, with high-brake 16 or low-brake 17 clutched, engine 1 is started with the vehicular inertia. Thus, in this run mode, with high-brake 16 or low-brake 17 clutched, engine 1 is started with vehicular inertia. Then, start of engine 1 is secured. After start of engine 1 is secured, for example, engine 1 serves as the drive source and the vehicle can run with the two-stage gear shift between the low gear ratio with low-brake 17 clutched and the high gear ratio with high-brake 16 clutched. Consequently, the limp form is established.

Figure 12:
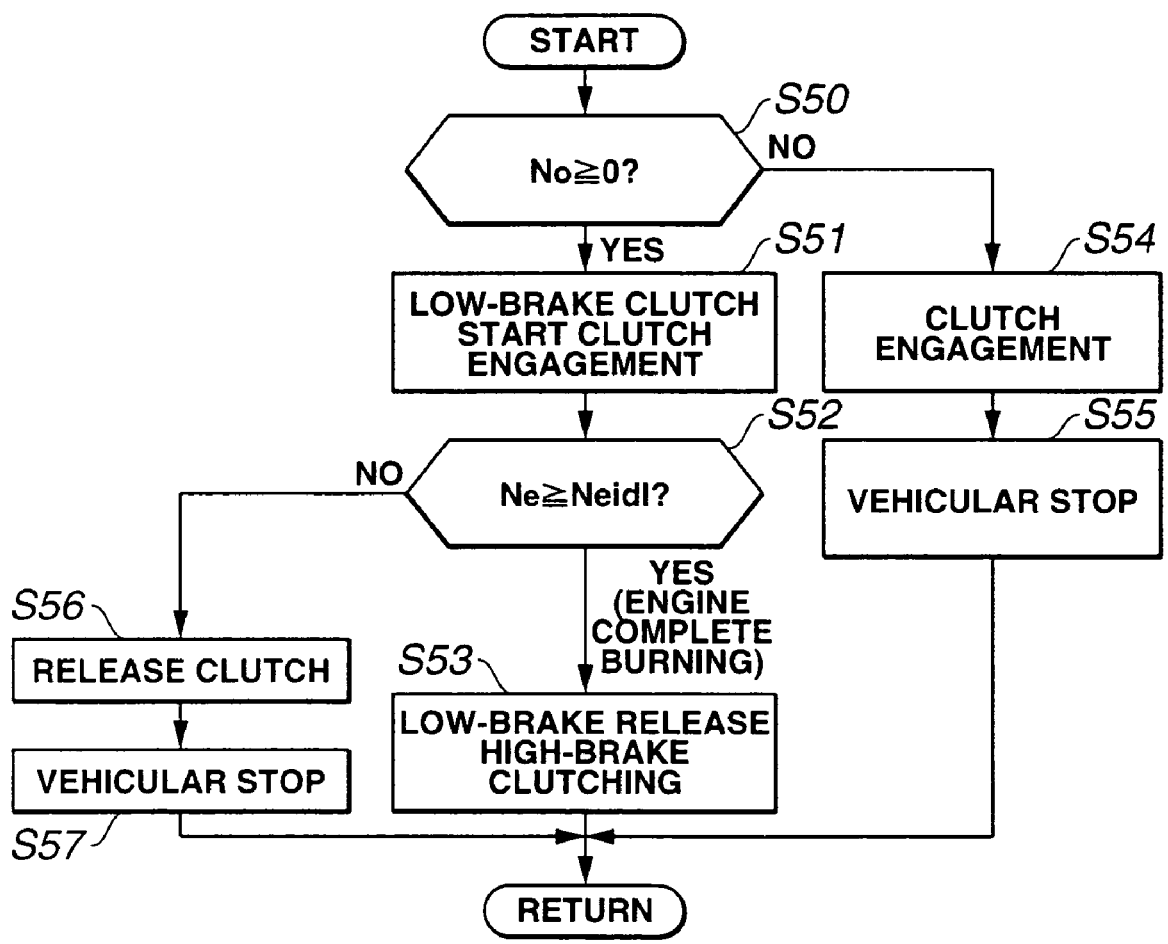
FIG. 12 is an operational flowchart for explaining a flow of an engine start procedure in an F pattern drive system failure countermeasure action in the control apparatus for taking failure countermeasure for the hybrid vehicular drive system in the first embodiment shown in FIG. 1.

Next, FIG. 12 shows an operational flowchart for explaining a start method of engine 1 with low-brake 17 clutched. At a step S50, hybrid controller 26 determines whether an output axle revolution speed No is equal to or higher than zero (No≧0). If No≧0 (Yes) at step S50, the routine goes to step S51. If No<0, the routine goes to a step S54. At step S51, hybrid controller 26 starts the clutching of low-brake 17 and engages clutch 15. Then, the routine goes to a step S52. At step S52, hybrid controller 26 determines whether engine speed Ne is equal to or higher than an idling speed Neidl.

If Ne≧Neidl (Yes) at step S52, the routine goes to a step S56. If Ne<Neidl (No) at step S52, the routine goes to a step S56. At step S53, hybrid controller 26 releases low-brake 17 and clutches high-brake 16 since engine 1 is completely burned (complete combustion). At step S54, hybrid controller 26 engages clutch 15 and, at the next step S55, stops the vehicle. At step S56, hybrid controller 26 releases clutch 15. At the next step S57, the vehicle is stopped.

Figure 13:
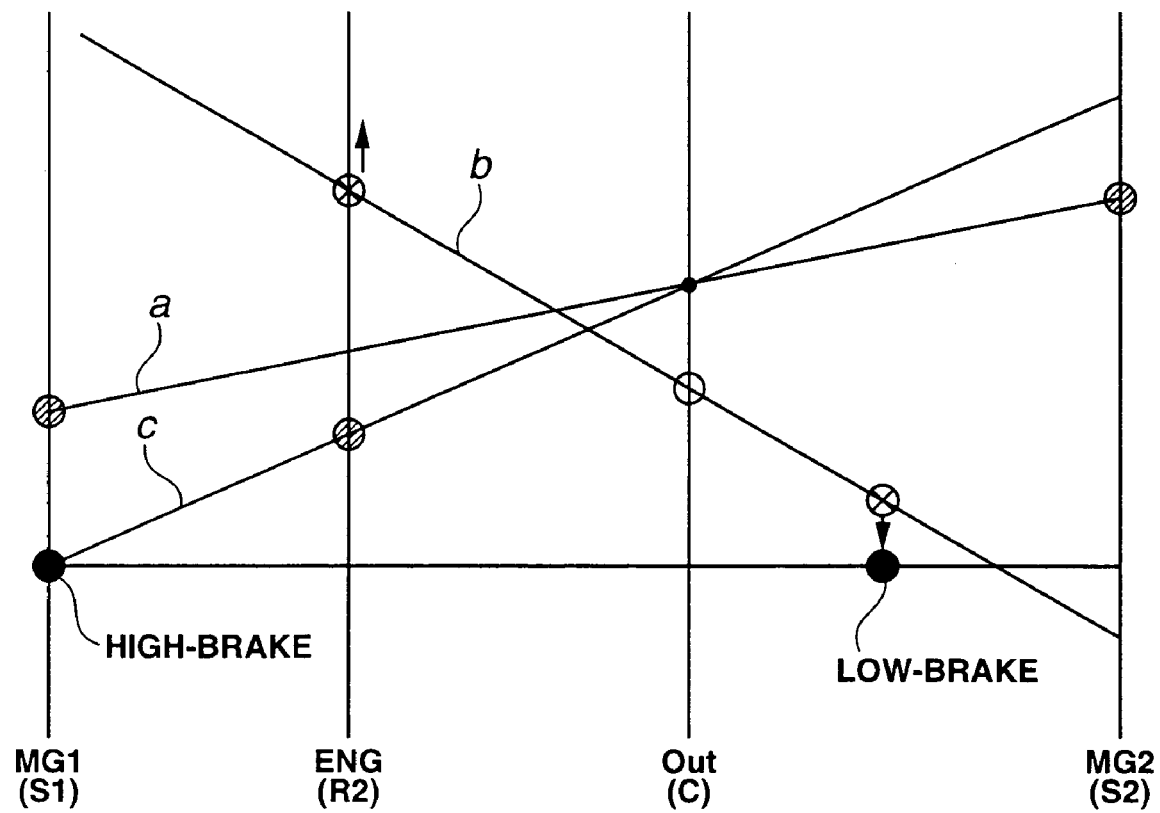
FIG. 13 is a lever diagram in the F pattern drive system failure countermeasure action in the control apparatus for taking failure countermeasure for the hybrid vehicular drive system in the first embodiment shown in FIG. 1.

First, in a case where the failure in inverter 24 occurs at the lever state denoted by a in FIG. 13 during the EV run mode, clutch 15 is engaged while low-brake 17 is being clutched. Thus, as denoted by the lever state of b in FIG. 13, a vicinity to output gear is revolved due to an engine inertia and a vehicular inertia and engine 1 is started.

Before a complete clutching of low-brake 17, engine 1 is completely burned (complete combustion). Therefore, as denoted by the lever state of c in FIG. 13, low-brake 17 is released and high-brake 16 is clutched. Although the vehicular velocity is more or less varied during the clutching operation of low-brake 17, an initially desired vehicular velocity is obtained if high-brake 16 is clutched after the complete combustion of engine 1. The clutching operation of low-brake 17 does not give the vehicular driver a large deceleration feeling due to an absorption of the revolution speed differences in the respective axles. In this way, engine 1 is started and the vehicle can run at the two-stage gear shift using low-brake 17 and high-brake 16. Thus, the limp form is established. When the motor/generator MG1 or MG2 is detected to be abnormal during the vehicle stop in the EV run mode, the flow in the flowchart in FIG. 12 is as follows: step S50→step S54→step S55. With clutch 15 engaged, engine 1 is stopped and the vehicle is stopped safely.

In addition, in a case where, in the EV run mode, either first motor/generator MG1 or second motor/generator MG2 is detected to be abnormal and engine 1 cannot be started although the vehicular velocity is at least low, the flow of the flowchart in this case is as follows: step S50→step S51→step S52→step S56→step S57. With clutch 15 released, the vehicle is stopped safely.

Next, advantages of the control apparatus for taking failure countermeasure for the hybrid vehicular drive system in the first embodiment according to the present invention will be described below.

(1) Since, in the hybrid vehicular drive system having Ravigneaux (type) compound planetary gear set 2 in which four revolvable elements of engine 1, first motor/generator MG1, second motor/generator MG2, and output gear 4 are linked in such a manner that the revolution speed order in the lever diagram of planetary gear set 3 is first motor/generator MG1, engine 1, output gear 4, and second motor/generator MG2, high-brake 16 arranged at a position on the lever diagram coincident with revolution speed axle of first motor/generator MG1 on the lever diagram to fix the gear ratio when clutched, low-brake 17 arranged at a position between the revolution speed axle of output gear 4 and the revolution speed axle of second motor/generator MG2 on the lever diagram thereof, the drive source output abnormality detecting section that detects the abnormality in the output of the drive source of any one of engine 1, first motor/generator MG1, and second motor/generator MG2, and the drive source failure countermeasure control section which enables the vehicle to run using at least one drive source whose output is not abnormal and either one of high-brake 16 or low-brake 17 when any one or two of the drive sources whose outputs are detected to be abnormal, the limp form can be established when the output abnormality occurs in any one or two of the drive sources of engine 1, first motor/generator MG1, and second motor/generator MG2.

(2) Since the drive source failure countermeasure control section provides means for fixing the run mode to the high-brake clutching run mode with engine 1 as drive source during the direct power distribution run mode due to the release of brake, with engine 1, first motor/generator MG1, and second motor/generator MG2 as drive sources, or when the output abnormality of at least one output of first motor/generator MG1 and second motor/generator MG2 is detected during the high-brake clutching run mode with engine 1 as the drive source, the vehicular run after the occurrence in the failure can safely be assured while the influence of a driving force variation in engine 1 due to the clutching of high-brake 16 is being reduced.

(3) Since the drive source failure countermeasure control section provides means for fixing the run mode to the low-brake clutching run mode with at least engine 1 as the drive source when the abnormality in at least one output of first motor/generator MG1 and second motor/generator MG2 is detected to occur during the low-brake clutching run mode with engine 1 as a drive source, the driving force variation in engine 1 permits the clutching of low-brake 17 to give less influence on the vehicle. Then, the vehicular run after the occurrence of the above-described failure can be assured.

(4) Since the drive source failure countermeasure control section provides means for fixing the run mode to the high-brake clutching run mode with second motor/generator MG2 as the drive source during the direct power distribution run mode with engine 1, first motor/generator MG1, and second motor/generator MG2 as the drive sources and with the brake released or during the high-brake clutching run mode with-engine 1 as the drive source, the vehicular run after the occurrence of failure can safely be assured as the EV vehicle in which the gear ratio is fixed at high gear ratio during the occurrence of failure in engine 1.

(5) Since the drive source failure countermeasure control section provides means for fixing the run mode to the low-brake clutching run mode with first motor/generator MG1 and second motor/generator MG2 as driving sources when the abnormality in the output of engine 1 is detected to occur during the low-brake clutching run mode with engine 1 as the drive source, the abnormal run after the occurrence of failure can safely be assured as EV vehicle fixed at the low gear ratio during the occurrence of failure in engine 1.

(6) Since the drive source failure countermeasure control section provides means for starting engine 1 with one of first motor/generator MG1 and second motor/generator MG2 which is normal serves as the drive source and with either high-brake 16 or low-brake 17 clutched to start engine 1 when the abnormality in the output of at least one of first motor/generator MG1 and MG2 is detected to occur, the start of engine 1 which is stopped immediately after the occurrence of failure can be carried out without use of an engine start exclusively used motor.

(7) Since the drive source failure countermeasure control section provides means for starting engine 1 due to the vehicular inertia with high-brake 16 or low-brake 17 clutched when the abnormality in the outputs of both of first motor/generator MG1 and second motor/generator MG2 is detected to occur during the run mode with at least one of first motor/generator MG1 and second motor/generator MG2 as the drive source during the stop of engine 1, the start of engine 1 can be carried out which is stopped immediately after the occurrence of failure without use of the engine start exclusively used motor.

(8) Since first motor/generator MG1 and second motor/generator MG2 are constituted by a coaxial multiple layer motor 2 having stator S as an stationary armature on which the coil is wound, an outer rotor OR arranged at an outside of stator S and in which a permanent magnet is buried, an inner rotor IR arranged at an inside of stator S and in which another permanent magnet is buried, inverter 24 which produces a compound current which is a composite of a drive current for inner rotor IR and that for outer rotor OR, battery 25 connected to inverter 24, the advantages in terms of a cost (reduced number of parts, a reduction in current rating of inverter 24, and a reduction in permanent magnet), a size (miniaturization due to the coaxial structure, a size reduction of inverter 24), and an efficiency (reduction in iron loss and reduction in inverter loss) can be obtained.

(9) Since the planetary gear mechanism is constituted by Ravigneaux (type) compound planetary gear set 3 having five revolvable elements of a common carrier C which supports mutually meshed first pinion P1 and second pinion P2, first sun gear S1 meshed with first pinion P1, second sun gear S2 meshed with second pinion P2, first ring gear R1 meshed with first pinion P2, and ring gear R2 meshed with second pinion P2, and second ring gear R2 and engine output axle 10 are linked via clutch 15, first sun gear S1 and first motor/generator output axle 11 are linked together, second sun gear S2 is linked with second motor/generator output axle 12, and output gear 4 (Out) is linked to common carrier C so that, on the lever diagram, the revolution speed order is such that first motor/generator MG1, engine 1, output gear 4, and second motor/generator MG2, the high-brake 16 is arranged at the position at which first sun gear Si is fixable to motor and gear casing 9, and the low-brake 17 is arranged at the position at which first ring gear R1 is fixable to motor and gear casing 9, a rigid body lever model by which a dynamic operation of planetary gear mechanism is represented can be introduced, the axial size of the planetary gear mechanism can be shortened, and a compact planetary gear mechanism can be achieved.

Second Embodiment

When, in a second preferred embodiment of the failure countermeasure control apparatus, the abnormality in one of the outputs of first motor/generator MG1 and MG2 is detected to occur although engine 1 is normal, engine 1 serves as the drive source of the vehicle and such a run mode at the two-stage gear ratio between the low gear ratio due to the low-brake clutching with engine 1 as the drive source and the high gear ratio due to the high-brake clutching with engine 1 as the drive source is achieved. The structure in the second embodiment is the same as that in the first embodiment. Hence, detailed description thereof will be omitted with reference to the drawings thereon.

Next, an action in the case of the second embodiment will be described below.

[Drive System Failure Countermeasure Control Process]

Figure 14:
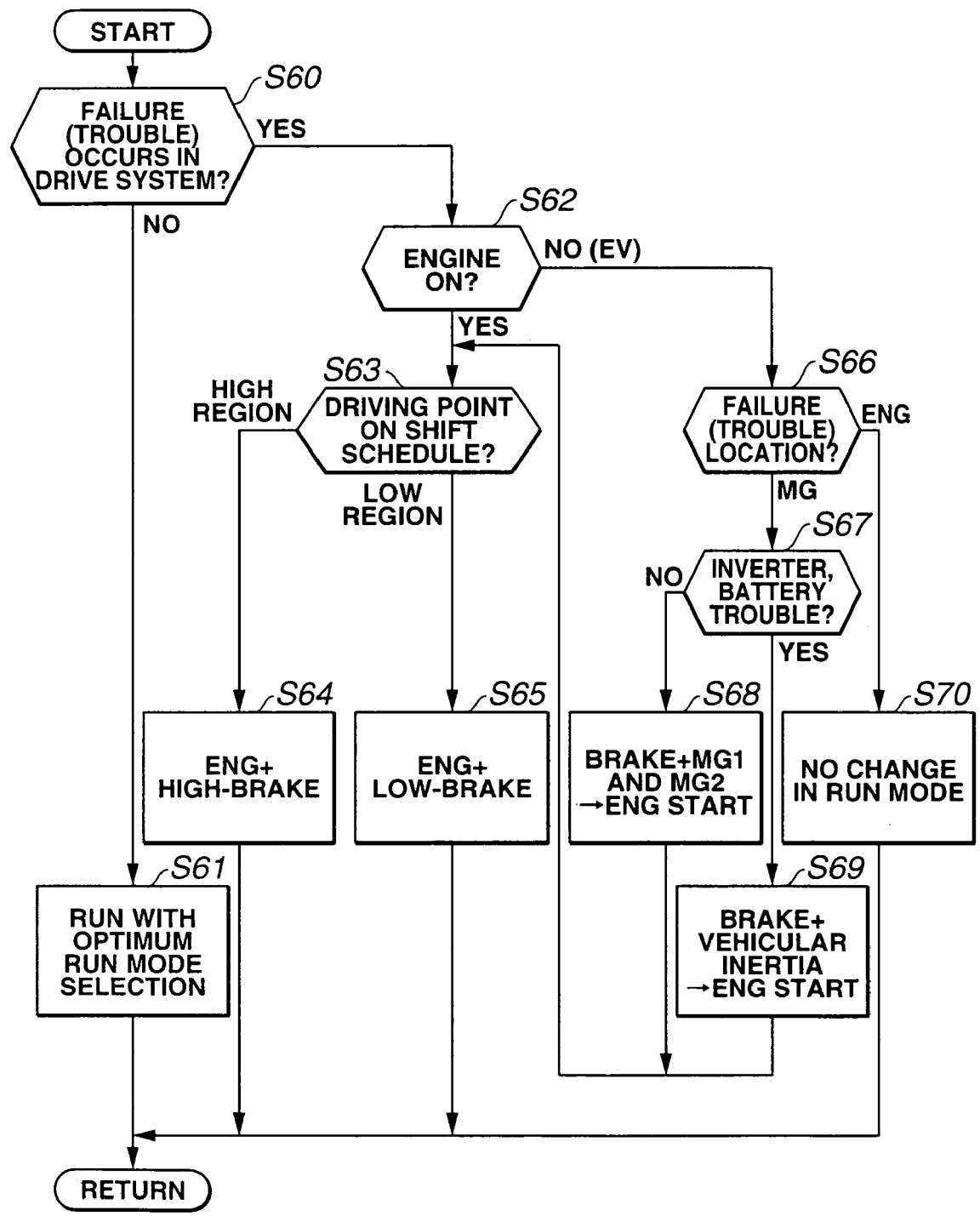
FIG. 14 is an operational flowchart executed by the hybrid controller for representing the drive system failure countermeasure control procedure in a second preferred embodiment of the control apparatus for taking failure countermeasure for the hybrid vehicular drive system.

FIG. 14 shows a flowchart representing a stream of the drive system failure countermeasure control process executed by hybrid controller 26 in the second embodiment.

At a step S60, hybrid controller 26 determines if the drive system failure occurs. If Yes at step S60, the routine goes to a step S62. If No at step S60, the routine goes to a step S61. At step S61, hybrid controller 26 selects an optimum run mode in accordance with the vehicular state or in accordance with the running state, for example, selects the direct power distribution run mode or EV (Electric Vehicle) run mode or EV (Electric Vehicle) run mode and executes the vehicular run control during a normality in the drive system in the selected run mode. At step S62, hybrid controller 26 determines if engine 1 is operated (ON). If Yes at step S62, the routine goes to a step S63. If No at step S62, the routine goes to a step S66. At step S63, hybrid controller 26 determines if a driving point of the vehicle is present in a low gear ratio region or in a high gear ratio region thereon using a shift schedule in which the whole drive region is divided into the high gear ratio region and the low gear ratio region. If the driving point is present in the high gear ratio region, the routine goes to a step S64. if the driving point is present in the low gear ratio region, the routine goes to a step S65.

At step S64, hybrid controller 26 fixes the run mode to the high-brake clutching run mode with engine 1 as the drive source on the basis of the gear ratio region determination at step S62. At step S65, hybrid controller 26 fixes the run mode to the low-brake clutching run mode with engine 1 as the drive source on the basis of the gear ratio region determination at step S62.

At step S66, hybrid controller 26 determines whether the trouble location is in the motor/generator system or in the engine system since the vehicle is determined to run in the EV run mode at step S62. If the trouble location is in the motor/generator system, the routine goes to a step S67. if the trouble location is in the engine system, the routine goes to a step S70. At step S67, hybrid controller 26 determines if the trouble location is inverter 24 or battery 24 from among the failures in the motor/generator system. If the failure of neither inverter 24 nor battery 24 is determined to occur (No) at step S67, the routine goes to a step S68. If the failure of either inverter 24 or battery 25 is determined to occur (Yes) at step S67, the routine goes to a step S69. At step S68, hybrid controller 26 starts engine 1 with high-brake 16 or low-brake 17 clutched and with one of first motor/generator MG1 and second motor/generator MG2 which is normal as the drive source when the abnormality in one of the outputs of first motor/generator MG1 and second motor/generator MG2 is detected to occur during the run mode in which at least one of first motor/generator MG1 and second motor/generator MG2 serves as the drive source with engine 1 stopped.

At step S69, hybrid controller 26 starts engine 1 according to the vehicular inertia with either high-brake 16 or low-brake 17 clutched when the abnormality in the outputs of both of the first and second motor/generators MG1 and MG2 is detected to occur during the run mode with the stop of engine 1 and with at least one of first and second motor/generators MG1 and MG2 as the drive source. Then, the routine jumps to step S63. At a step S70, hybrid controller 26 maintains the EV run mode without change in the run mode in a case where the vehicle is determined to run in the EV run mode at step S62 and determines that the trouble location is in the engine system without change in the run mode.

[Failure Countermeasure Control Action]

When the abnormality in at least one of the outputs of first motor/generator MG1 and second motor/generator MG2 is detected to occur during any run mode in which engine 1 is normally operated, the flow in the flowchart shown in FIG. 14 is step S60→step S62→step S63. In this case, at step S63, hybrid controller 26 determines whether the driving point on the shift schedule is present in the high gear ratio region or in the low gear ratio region. If the driving point is determined to be present in the high gear ratio region, the routine of FIG. 14 goes to step S64 in which the run mode is fixed to high-brake clutching run mode with engine 1 as the drive source. On the other hand, if the driving point is determined to be present in the low gear ratio region at step S63, the routine goes to step S65, the run mode is fixed to the low-brake clutching run mode with engine 1 as the drive source.

In addition, when, in the EV run mode, the abnormality in at least one of the outputs of first motor/generator MG1 and second motor/generator MG2 is detected to occur, the flow in the flowchart shown in FIG. 14 is step S60→step S62→step S66→step S67→step S68. At step S68, engine 1 is started with one of first motor/generator MG1 and second motor/generator MG2 which is normal as the drive source and with high-brake 16 or low-brake 17 clutched. When engine 1 is started, the routine of FIG. 14 goes to step S65. Furthermore, when, in the EV run mode, the abnormalities of both outputs of first motor/generator MG1 and second motor/generator MG2 are detected to occur, the flow of the flowchart shown in FIG. 14 is step S60→step S62→step S63→step S67→step S68. At step S68, engine 1 is started according to the vehicular inertia with one of first motor/generator MG1 and second motor/generator MG2 which is normal as the drive source and with high-brake 16 or low-brake 17 clutched. When engine 1 is started, the routine goes to step S63. Furthermore, in the EV run mode, the abnormality in the outputs of both of first and second motor/generators MG1 and MG2 is detected to occur, the flow in the flowchart shown in FIG. 14 is as follows: step S60→step S62→step S66→step S67→step S69. At step S69, with high-brake 16 or low-brake 17 clutched, engine 1 is started due to the vehicular inertia. When engine 1 is started, the routine shown in FIG. 14 goes to step S63.

Figure 15:
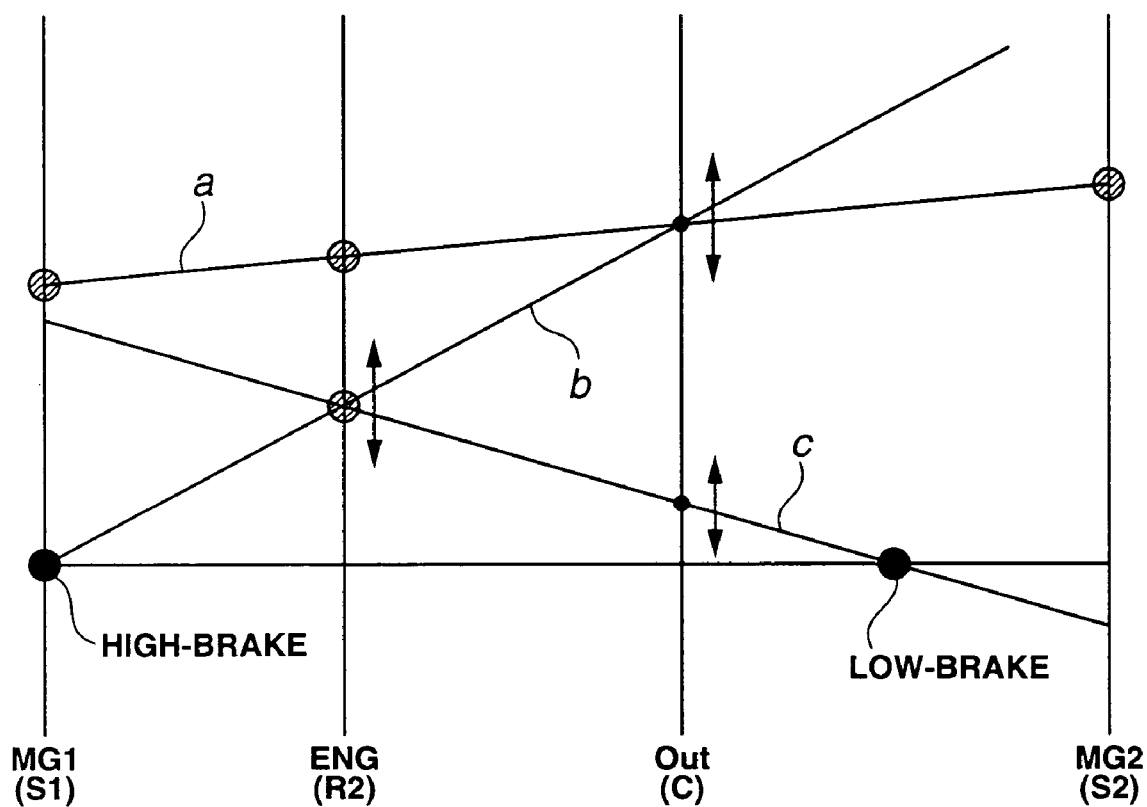
FIG. 15 is a lever diagram for explaining the drive system failure countermeasure action by means of a two-stage gear transmission in the control apparatus for taking failure countermeasure for the hybrid vehicular drive system.

If, at step S63, the driving point on the shift schedule is determined to be present in the high gear ratio region, the routine goes to step S64 in which the run mode is fixed to the high-brake clutching run mode with engine 1 as the drive source. Then, if, at step S63, the driving point is determined to he present in the low gear ratio region, the routine goes to a step S65 in which the run mode is fixed to the low-brake clutching run mode with engine 1 as the driving source. For example, if motor/generator in the lever state as denoted by the lever state of a in FIG. 15 has failed during the direct power distribution run mode, the run mode is fixed to the high-brake clutching run mode with engine 1 as the drive source. Thus, the lever state of a in FIG. 15 is transferred to the lever state of b in FIG. 15. In a case where the driving point is determined to be present in the low gear ratio region at step S63 when, for example, the vehicular velocity becomes lowered in a midway through the high-brake clutching run mode with engine 1 as the drive source, the run mode is fixed to the low-brake clutching run mode with engine 1 as the drive source. Thus, the run mode is transferred to the lever state denoted by the lever state of c shown in FIG. 15. In other words, the vehicle can run with the transmission causing the two-stage gear ratios. Consequently, the limp form is established.

Next, the advantage especially found in the second embodiment except the items of (1) through (9) described in the first embodiment will be described below.

(10) Since the drive source failure counter measure control section provides means for achieving the run mode at the two-stage gear ratio between the low gear ratio caused by the low-brake clutching with engine 1 as the drive source and the high gear ratio caused by the high-brake clutching with engine 1 as the drive source when engine 1 is normal but the abnormality in at least one of the outputs of first motor/generator MG1 and second motor/generator MG2 is detected to occur, the vehicular run after the failure can safely be assured as an engine drive vehicle in which the two-stage transmission is mounted using the high-brake 16 and low-brake 17 during the failure in the motor/generator system.

As described hereinabove, the failure countermeasure control apparatus for the hybrid vehicular drive system according to the present invention has been described on the basis of the first and second embodiments. However, a specific structure is not limited to that of each of these embodiments. Various changes and modifications may be made without departing from the sprit and scope of the present invention which is to be defined in the appended claims.

In each of the first and second embodiments, the first and second motor/generators MG1 and MG2 are constituted by a common stator S and two separate rotors which, on appearance, are a single motor/generator but are an application example of the co-axial multiple layer motor 2 functionally achieving two motors/generators. However, two independent motors/generators may be used. In each of the first and second embodiments, the planetary gear mechanism is constituted by Ravigneaux (type) compound planetary gear set 3. However, the planetary gear mechanism may be not limited to Ravigneaux (type) compound planetary gear provided that the planetary gear mechanism may be constituted by such a planetary gear mechanism having at least four revolvable elements to link four elements of engine, first motor/generator, second motor/generator, and the output member.

The entire contents of a Japanese Patent Application No. 2002-322045 (filed in Japan on Nov. 6, 2002) are herein incorporated by reference. The scope of the invention is defined with reference to the following claims.

What is claimed is:

1. A control apparatus for taking failure countermeasure for a hybrid vehicular drive system, comprising:
   a planetary gear mechanism to which four elements of an engine, a first motor/generator, a second motor/generator, and an output member are linked in such a manner that, on a lever diagram of the planetary gear mechanism, a revolution speed order is the first motor/generator, the engine, the output member, and the second motor/generator;
   first and second clutching sections that are arranged at one and the other ends of the lever diagram with the output member as an intermediate position on the lever diagram, each of the first and second clutching section prescribing a speed line according to a clutching thereof;
   a drive source output abnormality detecting section that detects an output abnormality of each of the engine, the first motor/generator, and the second motor/generator which are drive sources; and
   a drive source failure countermeasure control section that, with one of the first and second clutching sections clutched, enables a vehicular run using at least one of the drive sources whose output is detected to be normal when the drive source output abnormality detecting section detects that the output abnormalities in any one or two of the drive sources occur.

2. A control apparatus for taking failure countermeasure for a hybrid vehicular drive system as claimed in claim 1, wherein the first clutching section is a high-brake arranged at a position on the lever diagram coincident with a revolution speed axle of first motor/generator to fix a gear ratio when clutched and the second clutching section is a low-brake arranged at a position on the lever diagram between the revolution speed axle of the output member and the revolution speed axle of the second motor/generator to fix the gear ratio when clutched.

3. A control apparatus for taking failure countermeasure for a hybrid vehicular drive system as claimed in claim 2, wherein the drive source failure countermeasure control section fixes a run mode of the vehicle to a high-brake clutching run mode with the engine as the drive source when the output abnormality in at least one of the outputs of the first motor/generator and the second motor/generator is detected to occur during a brake release run mode with the engine, the first motor/generator, and the second motor/generator as the drive sources.

4. A control apparatus for taking failure countermeasure for a hybrid vehicular drive system as claimed in claim 2, wherein the drive source failure countermeasure control section fixes the run mode of the vehicle to a low-brake clutching run mode with at least engine as the drive source when the abnormality in at least one of the outputs of the first motor/generator and the second motor/generator is detected to occur during the low-brake clutching run mode with the engine as the drive source.

5. A control apparatus for taking failure countermeasure for a hybrid vehicular drive system as claimed in claim 2, wherein the drive source failure countermeasure control section fixes the run mode of the vehicle to the high-brake clutching run mode with the second motor/generator as the drive source when the abnormality in the output of the engine is detected to occur during the brake release run mode with the engine, the first motor/generator, and the second motor/generator as the drive sources.

6. A control apparatus for taking failure countermeasure for a hybrid vehicular drive system as claimed in claim 2, wherein the drive source failure countermeasure control section fixes the run mode to the low-brake clutching run mode with both of the first motor/generator and the second motor/generator as the drive sources when the abnormality of the output of the engine is detected to occur during the low-brake clutching run mode with the engine as the drive source.

7. A control apparatus for taking failure countermeasure for a hybrid vehicular drive system as claimed in claim 2, wherein the drive source failure countermeasure control section starts the engine with at least one of the high-brake and the low-brake clutched and with one of the first and second motors/generators which is detected to be normal as the drive source when the abnormality in at least one of the outputs of the first and second motors/generators is detected to occur during the run mode with at least one of the first and second motor/generator as the drive source and with a stop of the engine.

8. A control apparatus for taking failure countermeasure for a hybrid vehicular drive system as claimed in claim 2, wherein the drive source failure countermeasure control section starts the engine utilizing a vehicular inertia with at least one of the high-brake and the low-brake clutched when the abnormality in the outputs of both of the first and second motors/generators is detected to occur during the run mode with at least one of the first and second motors/generators as the drive source and with a stop of the engine.

9. A control apparatus for taking failure countermeasure for a hybrid vehicular drive system as claimed in claim 2, wherein the drive source failure countermeasure control section achieves a two-stage gear ratio run mode between a low gear ratio by means of the clutching of the low-brake with the engine as the drive source and a high gear ratio by means of the clutching of the high-brake with the engine as the drive source when the engine is detected to be normal but the abnormality in at least one output of the first motor/generator and the second motor/generator is detected to occur.

10. A control apparatus for taking failure countermeasure for a hybrid vehicular drive system as claimed in claim 2, wherein the planetary gear mechanism comprises a Ravigeaux compound planetary gear set including five revolvable elements of: a common carrier that supports mutually meshed first pinion and second pinion; a first sun gear meshed with a first pinion; a second sun gear meshed with a second pinion; a first ring gear meshed with the first pinion; and a second ring gear meshed with the second pinion and wherein the second ring gear is linked with an output axle of the engine via a clutch, the first sun gear is linked to an output axle of the first motor/generator, the second sun gear is linked to an output axle of the second motor/generator, and the common carrier is linked with the output member, the revolvable elements of the Ravigneaux compound planetary gear set are linked in such the manner that the revolution speed order on the lever diagram is the first motor/generator, the engine, the output member, and the second motor/generator, the high-brake is arranged at a position at which the first sun gear is enabled to be fixed to a casing, and the low-brake is arranged at a position at which the first ring gear is enabled to be fixed to the casing.

11. A control apparatus for taking failure countermeasure for a hybrid vehicular drive system as claimed in claim 2, wherein the drive source failure countermeasure control section fixes a run mode of the vehicle to a high-brake clutching run mode with the engine as the drive source when the output abnormality in at least one of the outputs of the first motor/generator and the second motor/generator is detected to occur during the high-brake clutching run mode with the engine as the drive source.

12. A control apparatus for taking failure countermeasure for a hybrid vehicular drive system as claimed in claim 2, wherein the drive source failure countermeasure control section fixes the run mode of the vehicle to the high-brake clutching run mode with the second motor/generator as the drive source when the abnormality in the output of the engine is detected to occur during the high-brake clutching run mode with the engine as the drive source.

13. A control apparatus for taking failure countermeasure for a hybrid vehicular drive system as claimed in claim 1, wherein the first and second motors/generators comprises a coaxial multiple layer motor including a stator as a stationary armature in which at least one coil is wound; an outer rotor arranged at an outside of the stator and in which a permanent magnet is buried; an inner rotor arranged at an inside of the stator and in which another permanent magnet is buried; an inverter connected to the coil of the stator that produces a compound current which is a composite of a drive current for the inner rotor and another drive current for the outer rotor; and a battery connected to the inverter.

14. A control method for taking failure countermeasure for a hybrid vehicular drive system, the hybrid vehicular drive system comprising: a planetary gear mechanism to which four elements of an engine, a first motor/generator, a second motor/generator, and an output member are linked in such a manner that, on a lever diagram of the planetary gear mechanism, a revolution speed order is the first motor/generator, the engine, the output member, and the second motor/generator; and first and second clutching sections that are arranged at one and the other ends of the lever diagram with the output member as an intermediate position on the lever diagram, each of the first and second clutching section prescribing a speed line according to a clutching thereof and the control method comprising:
   detecting an output abnormality of each of the engine, the first motor/generator, and the second motor/generator which are drive sources; and
   with one of the first and second clutching sections clutched, enabling a vehicular run using at least one of the drive sources whose output is detected to be normal when detecting that the output abnormalities in any one or two of the drive sources occur.

15. A control method for taking failure countermeasure for a hybrid vehicular drive system as claimed in claim 14, wherein the first clutching section is a high-brake arranged at a position on the lever diagram coincident with a revolution speed axle of first motor/generator to fix a gear ratio when clutched and the second clutching section is a low-brake arranged at a position on the lever diagram between the revolution speed axle of the output member and the revolution speed axle of the second motor/generator to fix the gear ratio when clutched.

16. A control method for taking failure countermeasure for a hybrid vehicular drive system as claimed in claim 15, wherein, at a time of enabling a vehicular run using at least one of the drive sources whose output is detected to be normal when detecting that the output abnormalities in any one or two of the drive sources occur, fixing a run mode of the vehicle to a high-brake clutching run mode with the engine as the drive source when the output abnormality in at least one of the outputs of the first motor/generator and the second motor/generator is detected to occur during a brake release run mode with the engine, the first motor/generator, and the second motor/generator as the drive sources.

17. A control method for taking failure countermeasure for a hybrid vehicular drive system as claimed in claim 16, wherein, at a time of enabling a vehicular run using at least one of the drive sources whose output is detected to be normal when detecting that the output abnormalities in any one or two of the drive sources occur, fixing the run mode of the vehicle to a low-brake clutching run mode with at least engine as the drive source when the abnormality in at least one of the outputs of the first motor/generator and the second motor/generator is detected to occur during the low-brake clutching run mode with the engine as the drive source.

18. A control method for taking failure countermeasure for a hybrid vehicular drive system as claimed in claim 16, wherein, at a time of enabling a vehicular run using at least one of the drive sources whose output is detected to be normal when detecting that the output abnormalities in any one or two of the drive sources occur, fixing the run mode of the vehicle to the high-brake clutching run mode with the second motor/generator as the drive source when the abnormality in the output of the engine is detected to occur during the brake release run mode with the engine, the first motor/generator, and the second motor/generator as the drive sources.

19. A control method for taking failure countermeasure for a hybrid vehicular drive system as claimed in claim 16, wherein, at a time of enabling a vehicular run using at least one of the drive sources whose output is detected to be normal when detecting that the output abnormalities in any one or two of the drive sources occur, fixing the run mode to the low-brake clutching run mode with both of the first motor/generator and the second motor/generator as the drive sources when the abnormality of the output of the engine is detected to occur during the low-brake clutching run mode with the engine as the drive source.

20. A control method for taking failure countermeasure for a hybrid vehicular drive system as claimed in claim 16, wherein, at a time of enabling a vehicular run using at least one of the drive sources whose output is detected to be normal when detecting that the output abnormalities in any one or two of the drive sources occur, starting the engine with at least one of the high-brake and the low-brake clutched and with one of the first and second motors/generators which is detected to be normal as the drive source when the abnormality in at least one of the outputs of the first and second motors/generators is detected to occur during the run mode with at least one of the first and second motor/generator as the drive source and with a stop of the engine.

21. A control method for taking failure countermeasure for a hybrid vehicular drive system as claimed in claim 16, wherein, at a time of enabling a vehicular run using at least one of the drive sources whose output is detected to be normal when detecting that the output abnormalities in any one or two of the drive sources occur, achieving a two-stage gear ratio run mode between a low gear ratio by means of the clutching of the low-brake with the engine as the drive source and a high gear ratio by means of the clutching of the high-brake with the engine as the drive source when the engine is detected to be normal but the abnormality in at least one output of the first motor/generator and the second motor/generator is detected to occur.

22. A control method for taking failure countermeasure for a hybrid vehicular drive system as claimed in claim 16, wherein, at a time of enabling a vehicular run using at least one of the drive sources whose output is detected to be normal when detecting that the output abnormalities in any one or two of the drive sources occur, fixing a run mode of the vehicle to a high-brake clutching run mode with the engine as the drive source when the output abnormality in at least one of the outputs of the first motor/generator and the second motor/generator is detected to occur during the high-brake clutching run mode with the engine as the drive source.

23. A control method for taking failure countermeasure for a hybrid vehicular drive system as claimed in claim 16, wherein, at a time of enabling a vehicular run using at least one of the drive sources whose output is detected to be normal when detecting that the output abnormalities in any one or two of the drive sources occur, fixing the run mode of the vehicle to the high-brake clutching run mode with the second motor/generator as the drive source when the abnormality in the output of the engine is detected to occur during the high-brake clutching run mode with the engine as the drive source.

* * * * *